(12) United States Patent
Shiba et al.

(10) Patent No.: US 8,903,663 B2
(45) Date of Patent: Dec. 2, 2014

(54) FLOW MEASUREMENT DEVICE

(75) Inventors: Fumikazu Shiba, Nara (JP); Koichi Takemura, Shiga (JP); Daisuke Bessyo, Nara (JP)

(73) Assignee: Panasonic Corporation, Osaka (JP)

( * ) Notice: Subject to any disclaimer, the term of this patent is extended or adjusted under 35 U.S.C. 154(b) by 671 days.

(21) Appl. No.: 12/809,311

(22) PCT Filed: Dec. 12, 2008

(86) PCT No.: PCT/JP2008/003750
§ 371 (c)(1),
(2), (4) Date: Jun. 18, 2010

(87) PCT Pub. No.: WO2009/078161
PCT Pub. Date: Jun. 25, 2009

(65) Prior Publication Data
US 2011/0238332 A1    Sep. 29, 2011

(30) Foreign Application Priority Data

Dec. 19, 2007 (JP) .............................. P2007-326890
Dec. 19, 2007 (JP) .............................. P2007-326891

(51) Int. Cl.
*G01F 23/28* (2006.01)
*G06F 19/00* (2011.01)
*G01F 1/66* (2006.01)

(52) U.S. Cl.
CPC ..................................... *G01F 1/667* (2013.01)
USPC ............................. 702/48; 702/50; 73/861.28

(58) Field of Classification Search
USPC ......... 702/48, 51, 50, 45, 79, 176; 73/861.27, 73/861.28
See application file for complete search history.

(56) References Cited

U.S. PATENT DOCUMENTS 5,163,013 A * 11/1992 Herzer et al. ................. 702/171
5,777,238 A * 7/1998 Fletcher-Haynes ........ 73/861.31
6,305,233 B1 * 10/2001 Braathen et al. ........... 73/861.28
(Continued)

FOREIGN PATENT DOCUMENTS

JP    2002-013958 A    1/2002
(Continued)

OTHER PUBLICATIONS

Japanese Patent Application Publication JP 2007-051889.*
Japanese Patent Application Publication JP 2002-162269.*
International Search Report for International Application No. PCT/JP2008/003750, dated Feb. 17, 2009, 2 pages.

*Primary Examiner* — Michael Nghiem
*Assistant Examiner* — Alexander Satanovsky
(74) *Attorney, Agent, or Firm* — Brinks Gilson & Lione

(57) ABSTRACT

To find the propagation time of an ultrasonic wave, a difference occurs between the waveforms received upstream and downstream in a portion where the reception amplitude is comparatively large and it is prevented from being detected as an error of the propagation time. A reception signal is amplified in a reception unit 35 and reception point storage units 38 store the most recent reception point data in a plurality of storage sections in order until the signal level becomes a predetermined value (Vref). An average value of the two zero crossing points before and after the signal level becomes Vref can be adopted as a reception point, the propagation time with a small error of up and down offset, etc., is measured, and it is made possible to realize power saving operation by shortening the measurement time.

12 Claims, 20 Drawing Sheets

(56) References Cited

U.S. PATENT DOCUMENTS

| | | | |
|---|---|---|---|
| 6,647,805 B2 * | 11/2003 | Kobayashi et al. | 73/861.27 |
| 6,772,643 B2 * | 8/2004 | Eguchi et al. | 73/861.28 |
| 7,213,468 B2 * | 5/2007 | Fujimoto | 73/861.27 |
| 2007/0241874 A1 * | 10/2007 | Okpysh et al. | 340/479 |

FOREIGN PATENT DOCUMENTS

| | | |
|---|---|---|
| JP | 2003-172645 A | 6/2003 |
| JP | 2003-232662 A | 8/2003 |
| JP | 2006-275608 A | 10/2006 |
| JP | 2007-051889 A | 3/2007 |

\* cited by examiner

US 8,903,663 B2

FLOW MEASUREMENT DEVICE

This application is a 371 application of PCT/JP2008/003750 having an international filing date of Dec. 12, 2008, which claims priority to JP2007-326890 filed Dec. 19, 2007 and JP2007-326891 filed Dec. 19, 2007, the entire contents of which are incorporated herein by reference.

TECHNICAL FIELD

This invention relates to a flow measurement device using ultrasonic vibrators, etc., for measuring the flow rate of a gas, a liquid, etc., using an ultrasonic wave.

A conventional flow measurement device will be discussed with reference to FIG. 20. A pair of ultrasonic vibrators 102 and 103 is placed on upstream and downstream sides of a flow path 101 where a fluid flows, and an ultrasonic wave crosses the fluid diagonally.

The flow velocity of the fluid is measured from the propagation time of the ultrasonic wave propagating between the above-mentioned pair of ultrasonic vibrators 102 and 103 and the flow rate is computed based on the flow velocity. For example, the flow velocity is found from the time difference and the flow rate value can be calculated considering the size of the duct and the flow state.

A solid line arrow 104 in the figure denotes the flowing direction of a fluid, and a dashed line arrow 105 denotes the propagating direction of an ultrasonic wave. The flowing direction of the fluid and the propagating direction of the ultrasonic wave cross each other at an angle θ (for example, refer to patent document 1).
Patent document 1: JP-A-2002-13958

Problems To Be Solved By The Invention

In the above-mentioned conventional measurement device, an ultrasonic wave is allowed to flow from the upstream ultrasonic vibrator 102 to the downstream ultrasonic vibrator 103, ultrasonic wave propagation time Tud is measured, an ultrasonic wave is allowed to flow from the downstream ultrasonic vibrator 103 to the upstream ultrasonic vibrator 102, ultrasonic wave propagation time Tdu is measured, the time difference is found using the measured ultrasonic wave propagation times Tud and Tdu and the like, and the flow rate is computed.

At this time, a reference level is set in the portion of a reception waveform where a predetermined amplitude can be obtained as a trigger level, and the propagation time is measured. Therefore, it is impossible to measure the ultrasonic wave propagation time using the zero crossing point preceding the trigger level.

Thus, an uncertain time is contained in the ultrasonic wave arrival time, an error may occur, and the measurement device has a problem in that it cannot realize highly accurate flow measurement.

That is, the reception waveform of an ultrasonic wave generally rises at a frequency driven by a drive circuit and changes to the oscillation frequency proper to an ultrasonic transducer in order.

Alternatively, since the effect of a reflected wave from a side wall of a flow path, etc., is received, etc., the frequency of the reception waveform of the ultrasonic wave is stable in the rising portion near to the reception point, but a difference occurs between the waveform received on the upstream side and the waveform received on the downstream side in the portion where the reception amplitude is comparatively large as the trigger level is set, and is detected as an error of the propagation time.

Since the ultrasonic wave reflected on a side wall of the flow path 101, etc., arrives with a little delay from a reception wave and is received as a reception wave, if an offset is deducted from the reception waveform, sometimes the zero crossing point passing through the zero point becomes uncertain.

Further, long-time measurement exceeding the essential arrival time means extra operation of the measurement device and thus the measurement device has also a problem of an increase in the current consumption.

The invention is embodied for solving the problem in the related art described above and it is an object of the invention to measure consecutively at least two zero crossing point arrival times of a received ultrasonic wave, make it possible to measure the arrival time of the ultrasonic wave using an average value thereof, lessen an error contained in the propagation time of the ultrasonic wave, realize highly accurate flow measurement, and realize power saving operation.

It is also an object of the invention to use consecutively at least two or more zero crossing point arrival times of the ultrasonic wave received before a trigger level, find an average value thereof, make it possible to measure the arrival time of the ultrasonic wave, lessen an error contained in the propagation time of the ultrasonic wave, realize highly accurate flow measurement, and realize power saving operation.

SUMMARY OF THE INVENTION

To solve the problem in the related art described above, a flow measurement device of the invention includes a pair of vibrators being placed in a flow path where a measured fluid flows for transmitting and receiving an ultrasonic wave, a transmission unit for driving one vibrator, a reception unit for converting an output signal of the other receiving-side vibrator into an electric signal, a reception wave determination unit for outputting a signal when the signal of the reception unit becomes a predetermined value, a reception point detection unit for outputting a signal when the signal of the reception unit becomes a predetermined range, two reception point storage units for storing output of the reception point detection unit, a time count unit for counting the propagation time of an ultrasonic wave signal propagating between the vibrators using each signal of the reception point storage units, a flow rate computation unit for calculating the flow rate based on the time count difference of the time count unit, and a control unit for controlling at least one of the transmission unit, the reception unit, the reception wave determination unit, the reception point detection unit, the reception point storage units, the time count unit, and the flow rate computation unit, wherein the zero crossing point arrival time of each received ultrasonic wave is stored in the two reception point storage units in order.

According to the configuration, the propagation time of the ultrasonic wave propagating between the upstream ultrasonic vibrator and the downstream ultrasonic vibrator, namely, the arrival time of the ultrasonic wave can be measured by averaging from the two zero crossing points before and after the trigger level. Thus, an error contained in the propagation time or the arrival time of the measured ultrasonic wave can be lessened and while highly accurate flow measurement is realized, power saving operation can be realized.

A flow measurement device of the invention includes a pair of vibrators being placed in a flow path where a measured fluid flows for transmitting and receiving an ultrasonic wave, a transmission unit for driving one vibrator, a reception unit for converting an output signal of the other receiving-side vibrator into an electric signal, a reception wave determination unit for outputting a signal when the signal of the reception unit becomes a predetermined value, a reception point detection unit for outputting a signal when the signal of the reception unit becomes a predetermined range, at least two or more reception point storage units for storing output of the reception point detection unit, a time count unit for counting the propagation time of an ultrasonic wave signal propagating between the vibrators using each signal of the reception point storage units, a flow rate computation unit for calculating the flow rate based on the time count difference of the time count unit, and a control unit for controlling at least one of the transmission unit, the reception unit, the reception wave determination unit, the reception point detection unit, the reception point storage units, the time count unit, and the flow rate computation unit, wherein the reception point storage units overwrite data for update until an output signal of the reception wave determination unit comes, and the zero crossing point arrival time of each received ultrasonic wave is stored in the plurality of reception point storage units in order.

According to the configuration, the propagation time of the ultrasonic wave propagating between the upstream ultrasonic vibrator and the downstream ultrasonic vibrator, namely, the arrival time of the ultrasonic wave can be measured by using consecutively at least two or more zero crossing point arrival times of the ultrasonic wave received before the trigger level and finding an average value thereof, an error contained in the propagation time of the ultrasonic wave is lessened and while highly accurate flow measurement is realized, power saving operation can be realized.

Advantages of the Invention

The flow measurement device of the invention can conduct measurement using the average value of the zero crossing points before and after the trigger level. Thus, if an offset, etc., is superposed, it can be canceled at the rising zero point and the falling zero point. An average value of two points is used, whereby an error contained in the propagation time or the arrival time of the measured ultrasonic wave can be lessened and while highly accurate flow measurement is realized, power saving operation can be realized.

The flow measurement device of the invention uses consecutively at least two or more zero crossing point arrival times of the ultrasonic wave received before the trigger level, finds an average value thereof, and can measure the arrival time of the ultrasonic wave. Thus, if an offset, etc., is superposed, it can be canceled at the rising zero point and the falling zero point. An average value of zero crossing points is used, whereby an error contained in the propagation time or the arrival time of the measured ultrasonic wave can be lessened and while highly accurate flow measurement is realized, power saving operation can be realized.

Figure 1:
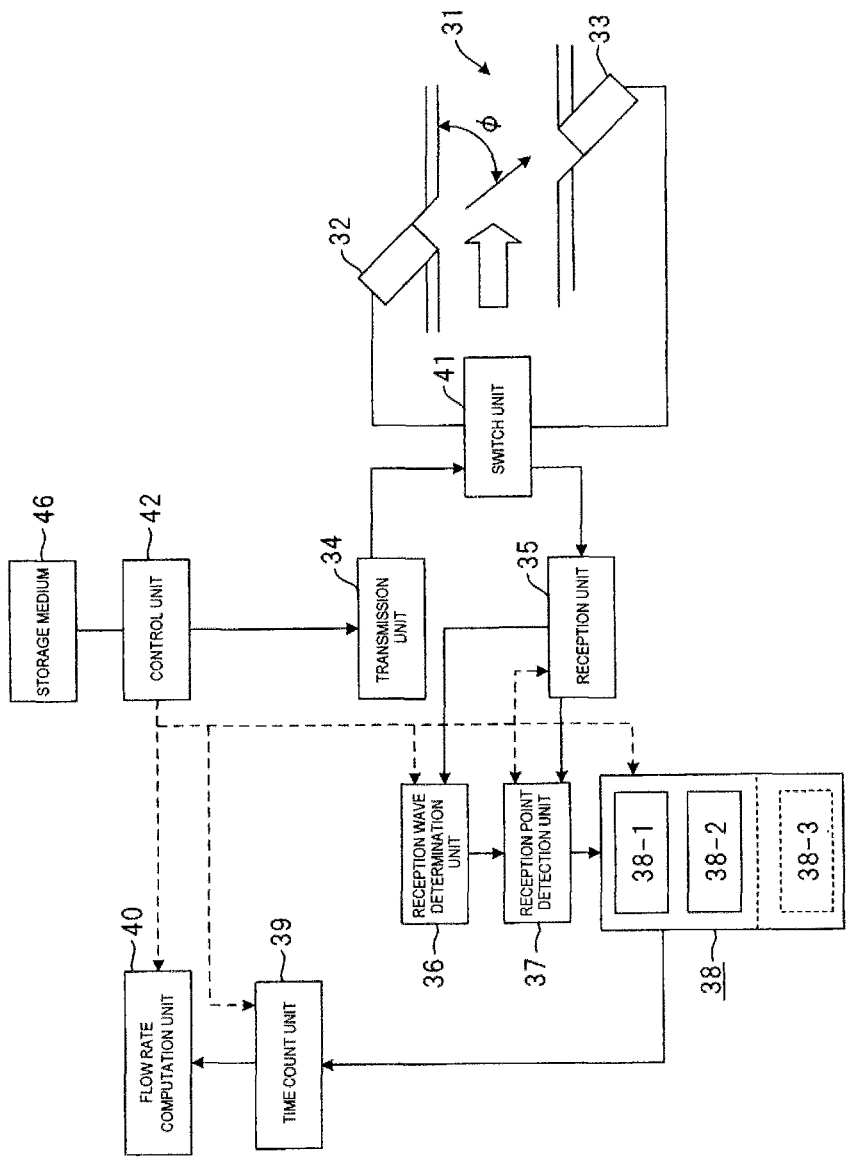
FIG. 1 is a general block diagram of a flow measurement device according to embodiment 1 of the invention.

DESCRIPTION OF REFERENCE NUMERALS 31, 231 Flow path
32, 232 First vibrator
33, 233 Second vibrator
34, 234 Transmission unit
35, 235 Reception unit
36, 236 Reception wave determination unit
37, 237 Reception point detection unit
38, 238 Reception point storage units
39, 239 Time count unit
40, 240 Flow rate computation unit 41, 241 Switch unit
42, 242 Control unit
43, 243 Power supply unit
44, 244 Trigger unit
45, 245 Time certification unit
46, 246 Storage medium

DETAILED DESCRIPTION OF THE PREFERRED EMBODIMENTS

A first aspect of the invention is embodied including a pair of vibrators being placed in a flow path where a measured fluid flows for transmitting and receiving an ultrasonic wave, a transmission unit for driving one vibrator, a reception unit for converting an output signal of the other receiving-side vibrator into an electric signal, a reception wave determination unit for outputting a signal when the signal of the reception unit becomes a predetermined value, a reception point detection unit for outputting a signal when the signal of the reception unit becomes a predetermined range, two reception point storage units for storing output of the reception point detection unit, a time count unit for counting the propagation time of an ultrasonic wave signal propagating between the vibrators using each signal of the reception point storage units, a flow rate computation unit for calculating the flow rate based on the time count difference of the time count unit, and a control unit for controlling at least one of the transmission unit, the reception unit, the reception wave determination unit, the reception point detection unit, the reception point storage units, the time count unit, and the flow rate computation unit, wherein the zero crossing point arrival time of each received ultrasonic wave is stored in the two reception point storage units in order.

According to the configuration, the propagation time of the ultrasonic wave propagating between the upstream ultrasonic vibrator and the downstream ultrasonic vibrator, namely, the arrival time of the ultrasonic wave can be measured by averaging from the two zero crossing points before and after the trigger level. Thus, an error contained in the propagation time or the arrival time of the measured ultrasonic wave can be lessened and while highly accurate flow measurement is realized, power saving operation can be realized.

A second aspect of the invention is embodied including a pair of vibrators being placed in a flow path where a measured fluid flows for transmitting and receiving an ultrasonic wave, a transmission unit for driving one vibrator, a reception unit for converting an output signal of the other receiving-side vibrator into an electric signal, a reception wave determination unit for outputting a signal when the signal of the reception unit becomes a predetermined value, a reception point detection unit for outputting a signal when the signal of the reception unit becomes a predetermined range, at least two or more reception point storage units for storing output of the reception point detection unit, a time count unit for counting the propagation time of an ultrasonic wave signal propagating between the vibrators using each signal of the reception point storage units, a flow rate computation unit for calculating the flow rate based on the time count difference of the time count unit, and a control unit for controlling at least one of the transmission unit, the reception unit, the reception wave determination unit, the reception point detection unit, the reception point storage units, the time count unit, and the flow rate computation unit, wherein the zero crossing point arrival time of each received ultrasonic wave is stored in the two or more reception point storage units in order.

According to the configuration, the propagation time of the ultrasonic wave propagating between the upstream ultrasonic vibrator and the downstream ultrasonic vibrator, namely, the arrival time of the ultrasonic wave can be measured by averaging from any two consecutive zero crossing points. Thus, an error contained in the propagation time or the arrival time of the measured ultrasonic wave can be lessened and while highly accurate flow measurement is realized, power saving operation can be realized.

A third aspect of the invention is embodied including a pair of vibrators being placed in a flow path where a measured fluid flows for transmitting and receiving an ultrasonic wave, a transmission unit for driving one vibrator, a reception unit for converting an output signal of the other receiving-side vibrator into an electric signal, a reception wave determination unit for outputting a signal when the signal of the reception unit becomes a predetermined value, a reception point detection unit for outputting a signal when the signal of the reception unit becomes a predetermined range, at least two or more reception point storage units for storing output of the reception point detection unit, a time count unit for counting the propagation time of an ultrasonic wave signal propagating between the vibrators using each signal of the reception point storage units, a flow rate computation unit for calculating the flow rate based on the time count difference of the time count unit, and a control unit for controlling at least one of the transmission unit, the reception unit, the reception wave determination unit, the reception point detection unit, the reception point storage units, the time count unit, and the flow rate computation unit, wherein the reception point storage units overwrite data for update until an output signal of the reception wave determination unit comes.

According to the configuration, the propagation time of the ultrasonic wave propagating between the upstream ultrasonic vibrator and the downstream ultrasonic vibrator, namely, the arrival time of the ultrasonic wave can be measured by using consecutively at least two or more zero crossing point arrival times of the ultrasonic wave received before the trigger level and finding an average value thereof. Thus, if an offset, etc., is superposed, it can be canceled at the rising zero point and the falling zero point. An average value of zero crossing points is used, whereby an error contained in the propagation time or the arrival time of the measured ultrasonic wave can be lessened and while highly accurate flow measurement is realized, power saving operation can be realized.

A fourth aspect of the invention is as follows: Particularly in any of the first to third aspects of the invention, the control unit has a power supply unit for energizing the reception point storage units for storing output of the reception point detection unit for a long time only the first time. Accordingly, it is made possible to reliably capture a reception wave by preparing for storing output of the reception wave detection unit before essential reception wave arrival at the first measurement time.

A fifth aspect of the invention is as follows: Particularly in any of the first to third aspects of the invention, the control unit has a power supply unit for controlling the energizing time and adjusts the timing of the power supply unit so as to energize the reception point storage units for storing output of the reception point detection unit for a short time based on the preceding value at the second or later time. Accordingly, it is made possible to reliably capture a reception wave and perform power saving operation by preparing for storing output of the reception wave detection unit just before arrival of the reception wave and it is also made possible to perform power saving operation.

A sixth aspect of the invention is as follows: Particularly in any of the first to third aspects of the invention, the control unit has a power supply unit for controlling the energizing time and a trigger unit for outputting a signal when the reception point detection unit outputs exceeding a predetermined number of times and the power supply unit starts energizing the reception point storage units for storing output of the reception point detection unit according to output of the trigger unit. Accordingly, it is checked that reliably a reception wave arrives and then preparation for storing output of the reception point detection unit is made, whereby reliability is improved and further it is made possible to perform power saving operation by performing the short time operation.

A seventh aspect of the invention is as follows: Particularly in any of the first to third aspects of the invention, the control unit has a power supply unit for stopping power supply to the reception point storage units after the expiration of a predetermined time after output of the reception point detection unit after output of the reception wave determination unit. Accordingly, the operation of measuring and storing an extra zero crossing point can be stopped and it is made possible to realize the power saving operation.

An eighth aspect of the invention is as follows: Particularly in the first or second aspect of the invention, the control unit has a storage control unit for adjusting so that data in the reception point storage units is overwritten in order starting at the oldest data. Accordingly, even in a state in which the number of zero crossing points increases, a plurality of zero crossing points in the proximity of the reception wave determination unit can be captured reliably and the number of reception point storage units is lessened and data is overwritten in order, whereby power saving operation is made possible.

A ninth aspect of the invention is as follows: Particularly in the first or second aspect of the invention, the control unit has a reception point selection unit for selecting the value in the reception point storage units retroacting only a predetermined number according to output of the reception wave determination unit for propagation time computation. Accordingly, it is made possible to use any zero crossing point considerably preceding the signal output by the reception wave determination unit to set a reception point, an error contained in the propagation time or the arrival time of the measured ultrasonic wave can be more lessened, and while highly accurate flow measurement is realized, power saving operation can be realized.

A tenth aspect of the invention is as follows: Particularly in the first or second aspect of the invention, the control unit has a time certification unit for computing the difference between the value in the reception point storage units retroacting only a predetermined number according to output of the reception wave determination unit and output of the reception wave determination unit and if the value of the time certification unit is within a predetermined value, measurement is determined valid measurement. Accordingly, erroneous detection of a zero crossing point caused by noise, etc., can be prevented and a precise zero crossing point is selected, whereby it is made possible to improve reliability.

An eleventh aspect of the invention is as follows: Particularly in the third aspect of the invention, the control unit has a time certification unit for computing the difference between output of the reception point detection unit after output of the reception wave determination unit and the value in the reception point storage units and if the value of the time certification unit is within a predetermined value, measurement is determined valid measurement. Accordingly, erroneous detection of a zero crossing point caused by noise, etc., can be prevented and a precise zero crossing point is selected, whereby it is made possible to improve reliability.

A twelfth aspect of the invention has a configuration having a program for causing a computer to function as the control unit of the flow measurement device particularly in any one of the first to eleventh aspects of the invention. Accordingly, operation setting and change of the measurement method can be easily made and secular change, etc., can also be flexibly dealt with, so that the accuracy of measurement can be improved and power saving operation can be performed more flexibly.

Embodiments of the invention will be discussed with reference to the accompanying drawings. The invention is not limited by the embodiments.

(Embodiment 1)

In FIG. 1, an ultrasonic flowmeter of the embodiment forming a flow measurement device has a flow path 31 where a measured fluid flows and a first vibrator 32 and a second vibrator 33 placed in the flow path 31 for transmitting and receiving an ultrasonic wave. It also has a transmission unit 34 for driving the first vibrator 32 and the second vibrator 33, a reception unit 35 for receiving reception signals of the first vibrator 32 and the second vibrator 33 and amplifying the signals, a reception wave determination unit 36 for outputting a signal when the signal of the reception unit 35 becomes a predetermined value, and a reception point detection unit 37 for outputting a signal when the signal of the reception unit 35 becomes a predetermined range. It also has two reception point storage units 38 for storing output of the reception point detection unit 37, a time count unit 39 for counting the propagation time of an ultrasonic wave signal propagating between the vibrators using each signal of the reception point storage units 38, and a flow rate computation unit 40 for calculating the flow rate based on the time count difference of the time count unit 39. Further, a switch unit 41 is provided between the transmission unit 34 and the first vibrator 32 and between the second vibrator 33 and the reception unit 35 so that the first vibrator 32 and the second vibrator 33 switch between transmission and reception of an ultrasonic wave for operation.

A control unit 42 controls at least one of the transmission unit 34, the reception unit 35, and the reception wave determination unit 36, the reception point detection unit 37, the reception point storage units 38, and the time count unit 39, the flow rate computation unit 40, and the switch unit 41.

The operation of usual flow velocity or flow rate measurement will be discussed. The time count unit 39 starts time measurement at the same time as the transmission unit 34 receiving a start signal from the control unit 42 performs pulse drive of the first vibrator 32 for a given time.

An ultrasonic wave is transmitted from the first vibrator 32 subjected to the pulse drive. The ultrasonic wave transmitted from the first vibrator 32 propagates through a measured fluid and is received at the second vibrator 33.

A signal of reception output of the second vibrator 33 is amplified by the reception unit 35 and then reception of the ultrasonic wave is determined at the signal level of a predetermined reception timing. When reception of the ultrasonic wave is determined, the operation of the time count unit 39 is stopped and the flow velocity is found according to (expression 1) from time information t.

where the measurement time obtained from the time count unit 39 is t, the effective distance in the flow direction between the ultrasonic vibrators is L, the degree of certainty is $\phi$, acoustic velocity is c, and the flow velocity of the measured fluid is v.

$$v = (1/\cos\phi) * (L/t) - c \qquad \text{(expression 1)}$$

The reception unit 35 often is adapted usually to make a comparison between a reference voltage and a reception signal by a comparator.

Transmission and reception directions between the first ultrasonic vibrator 32 and the second ultrasonic vibrator 33 are switched, the propagation time from the upstream side to the downstream side of a measured fluid and that from the downstream side to the upstream side are measured, and the velocity v can be found according to (expressions 2, 3, and 4).

where the measurement time time from the upstream side to the downstream side is t1 and the measurement time time from the downstream side to the upstream side is t2.

$$t1 = L/(c + v*\cos \phi) \quad \text{(expression 2)}$$

$$t2 = L/(c - v*\cos \phi) \quad \text{(expression 3)}$$

$$v = (L/2*\cos \phi)*((1/t1) - (1/t2)) \quad \text{(expression 4)}$$

This method enables the flow degree to be measured without receiving the effect of change in the acoustic velocity and thus can be used widely for measurement of the flow velocity, the flow rate, the distance, etc.

When the flow velocity v is found, it can be multiplied by the cross-sectional area of the flow path 31 to derive the flow rate.

Figure 2:
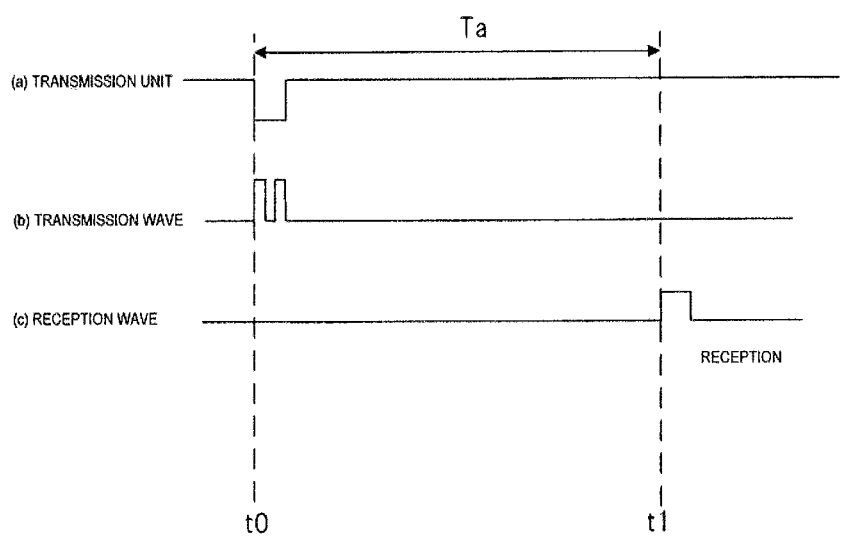
FIG. 2 (a) is a timing chart to show the operation of measurement control unit in the measurement device; (b) is a timing chart to show the operation of a transmission wave in the measurement device; and (c) is a timing chart to show the operation of a reception wave and a reflected wave in the measurement device.

The operation will be discussed with a timing chart of FIG. 2 and reception waveforms in FIGS. 3 and 4. Measurement is started from a start signal at time t0 by the control unit 42 and the first ultrasonic vibrator 32 is driven through the transmission unit 34.

An ultrasonic wave signal generated here propagates through the flow path and at time t1, an ultrasonic wave produced from the first ultrasonic vibrator 32 arrives at the second ultrasonic vibrator 33. The reception signal is amplified by the reception unit 35 and when the signal level becomes a predetermined value (Vref), the reception wave determination unit 36 determines that the reception wave arrives, and outputs a signal.

The reception point detection unit 37 starts to operate based on the signal and outputs a signal by assuming that the first zero crossing point after Vref is a reception point and the time to the point is found by the time count unit 39. Transmission and reception are switched by the switch unit 41 and similar operation is performed and the flow rate computation unit 40 calculates the flow rate based on the difference between the time found by the time count unit 39 and the time found a little while ago.

Figure 3:
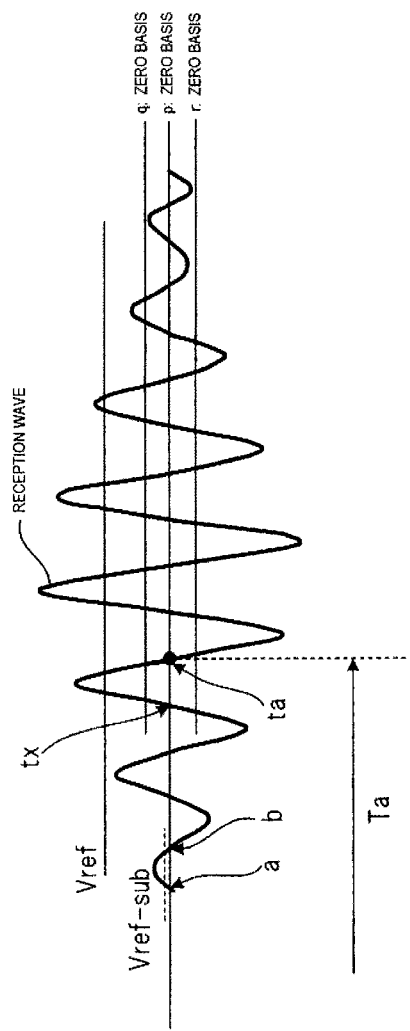
FIG. 3 is a timing chart to show a reception wave in the measurement device.

Here, ta point in FIG. 3 is placed after Vref, because the value of Vref is used as reception wave determination and the zero crossing point ta after Vref is adopted as the reception point. The zero basis used as the basis of the zero crossing point is p.

If an offset occurs on the plus side, the zero basis becomes as q and the zero crossing point arrives earlier than the essential point. In contrast, if an offset occurs on the minus side, the zero basis becomes as r and the zero crossing point occurs later than the essential point.

Likewise, if noise occurs and the reception waveform shifts to the plus side, the zero crossing point arrives later than the essential ta point; in contrast, if the reception waveform shifts to the minus side because of noise, etc., the zero crossing point arrives earlier than the essential ta point.

Thus, it is considered that if reception point determination of only one point is made, the accuracy of the reception time worsens because of disturbance of an offset, noise, etc.

Then, a method of detecting a zero crossing point with good accuracy and finding a reception point even if such disturbance occurs will be discussed. Here, a method of starting to detect the zero crossing point before Vref will be discussed.

It is good that simply the reception wave arrival point, for example, a point in FIG. 3 can be found for the zero crossing point, in which case Vref cannot be set. If the next b point near to the a point is adopted as the reception wave arrival point, Vref must be set to dashed line Vref-sub.

In this case, since it is close to a zero signal, reaction occurs due to change in the waveform, small noise, etc., when the flow rate flows, and there is a possibility of erroneous detection.

To circumvent such a phenomenon and determine the reception wave arrival point with better accuracy than usual ta, two zero crossing points are found consecutively and an average value thereof is used, whereby offset shift can be canceled.

Figure 4:
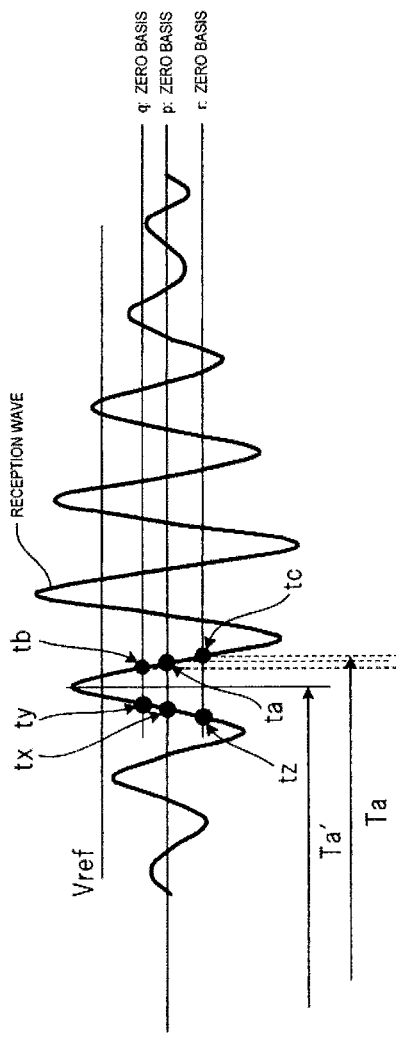
FIG. 4 is a timing chart to show measurement of a reception wave in the measurement device.

For example, the conventional zero crossing point may shift from ta point to tb, tc point because an offset occurs as shown in FIG. 4. In this case, Ta time becomes very unstable as the reception wave arrival point.

If two zero crossing points are used and an average thereof is found, tx is adopted relative to ta, ty is adopted relative to tb, and tz is adopted relative to tc and their average Ta' becomes a constant value and becomes stable.

That is, to prevent erroneous detection caused by waveform change, noise, etc., and determine the reception wave arrival point in a shorter time than usual ta, at least one zero crossing point before Vref may be detected and an average value may be found in a pair with the zero crossing point after the arrival point of Vref.

To realize this operation, measurement is started from a start signal at time t0 by the control unit 42 and the first ultrasonic vibrator 32 is driven through the transmission unit 34.

An ultrasonic wave signal generated here propagates through the flow path and at time t1, an ultrasonic wave produced from the first ultrasonic vibrator 32 arrives at the second ultrasonic vibrator 33.

The reception signal is amplified by the reception unit 35 and when the signal level becomes a predetermined value (Vref), the reception wave determination unit 36 determines that the reception wave arrives, and outputs a signal.

Thus, the reception point detection unit 37 for outputting a signal when a predetermined range as the zero crossing point, for example, the range of plus 1 mV to minus 1 mV is entered starts to operate.

Figure 5:
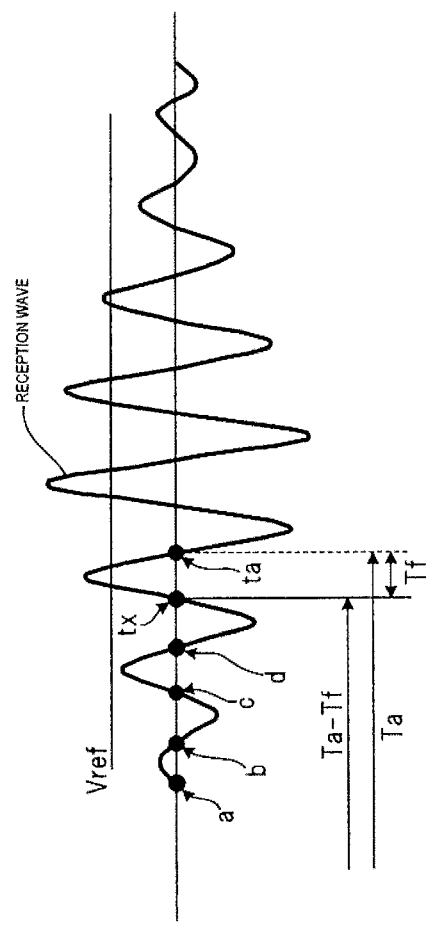
FIG. 5 is a timing chart to show a reception wave in the measurement device.

When the point becomes point a in FIG. 5, the reception point detection unit 37 outputs a signal and the reception point storage unit 38-1 stores this output signal.

If the stored value is the elapsed time from the transmission time or the number of pulses, etc., having a specific constant duration capable of measuring the elapsed time, it becomes easy to perform the later computation.

Next, when the point becomes point b in FIG. 5, likewise the reception point detection unit 37 outputs a signal and the data in the reception point storage unit 38-1 is overwritten with the output.

In this case, if the number of reception point data pieces is larger than the number of storage units 38, the control unit 42 may control the write order so that the data is overwritten in order starting at the oldest reception point.

The reception wave determination unit 36 does not output a signal until the reception signal exceeds Vref. When the reception wave determination unit 36 outputs a signal, the control unit 42 stores the next zero crossing point in the storage unit 38-2 and then prevents the reception point detection unit 37 from outputting a signal at the later zero crossing point or prohibits write into the reception point storage units 38.

Since the zero crossing points of tx and ta are stored by performing the operation, an average of the two points is used to find the propagation time in the time count unit 39.

Transmission and reception are switched by the switch unit 41 and similar operation is performed and the flow rate computation unit 40 calculates the flow rate based on the difference between the time found by the time count unit 39 and the time found a little while ago.

Consequently, the reception arrival point can be determined at the two points of tx and ta. Hitherto, the propagation time has been determined at ta in FIG. 5, but the effect of an offset cannot be circumvented.

In the method of the embodiment, an error contained in the propagation time or the arrival time of the measured ultrasonic wave can be lessened and highly accurate flow measurement can be realized.

If reception point data is written into the reception point storage units 38-1 and 38-2 alternately each time the zero crossing point arrives from the a point in FIG. 5 and the operation is stopped when the reception data exceeds Vref, average processing is performed using d and tx and the reception arrival point can be determined.

Such processing is performed, whereby the propagation time hitherto taken to ta in FIG. 5 can be determined at a point before ta, so that it is made possible to shorten the measurement operation time of the propagation time and power saving operation can be realized. Specifically, the measurement time can be shortened as much as Tf in FIG. 5.

Although the configuration using the two reception point storage units 38 has been described, more than two storage units may be used to store data in order and the propagation time may be determined using two consecutive zero crossing points from among them.

In this case, if data of one zero crossing point becomes defective because of noise, etc., measurement can be continued using a pair of consecutive zero crossing points from the remaining reception data.

The arrival time of the ultrasonic wave can be measured as an average from any two consecutive zero crossing points.

Thus, an error contained in the propagation time or the arrival time of the measured ultrasonic wave can be lessened and while highly accurate flow measurement is realized, power saving operation can be realized.

If a more valid value as the arrival point at a distance from Vref like a pair of a and b points, for example, is selected for the zero crossing point to be selected as a reception point, distortion of the waveform is small and an error contained in the propagation time or the arrival time or the arrival time of the ultrasonic wave can be lessened and while highly accurate flow measurement is realized, power saving operation can be realized.

In this case, however, the effect of noise is easily received although the error of the propagation time can be more lessened.

If tx near to Vref is selected, there is a possibility that distortion may occur in the reception waveform, but the effect of noise, etc., is not received and a higher reproducibility value can be obtained.

A system having better usability can be provided by considering high accuracy and high reproducibility and changing the reception point in response to the purpose of measurement and the case classification state of the signal state of the noise state, etc.

Thus, a plurality of zero crossing points are stored, whereby the propagation time are found using as many reception points as the predetermined number of points preceding Vref and flow measurement can be realized.

That is, the propagation time of the ultrasonic wave propagating between the upstream ultrasonic vibrator and the downstream ultrasonic vibrator, namely, the arrival time of the ultrasonic wave can be measured using the points before Vref of the trigger level.

Thus, an error contained in the propagation time or the arrival time of the measured ultrasonic wave can be lessened and while highly accurate flow measurement is realized, power saving operation can be realized.

Even in a state in which the number of zero crossing points increases, a plurality of zero crossing points in the proximity of the reception wave determination unit can be captured reliably and the number of reception point storage units is lessened properly and data is overwritten in order, whereby power saving operation is made possible.

Although the reception point storage units 38 for storing output of the reception point detection unit 37 consume power to perform the storage operation, often what point in time the storage unit may be energized from is previously unknown.

If power is turned on too early, it is wasted; if the storage unit is energized after passage of a reception point, the operation is meaningless.

Figure 6:
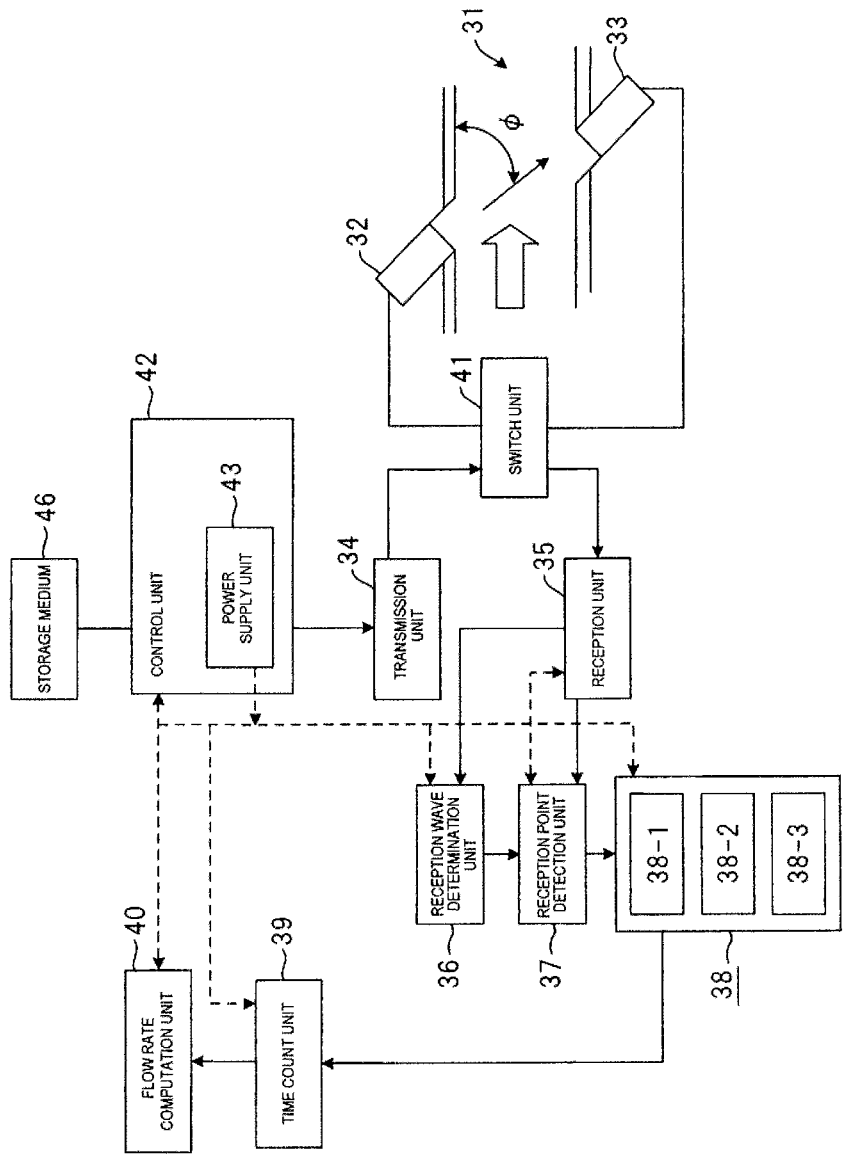
FIG. 6 is a general block diagram to show another operation configuration of the flow measurement device of the embodiment.
Figure 7:
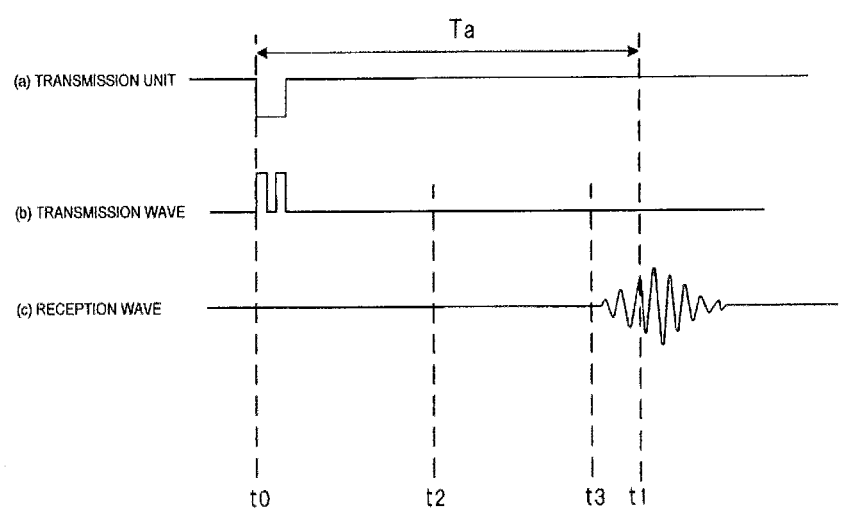
FIG. 7 (a) is a timing chart to show the operation of measurement control unit in the measurement device; (b) is a timing chart to show the operation of a transmission wave in the measurement device; and (c) is a timing chart to show the operation of a reception wave and a reflected wave in the measurement device.

Then, a power supply unit 43 is provided in the control unit 42 for performing power control as in the configuration shown in FIG. 6. The timing will be discussed with FIG. 7. To start measurement initially, Ta is unknown.

Although an approximate time can be estimated from the physical distance between the ultrasonic vibrators 32 and 33, the time is not certain. Then, the control unit 42 uses the power supply unit 43 to adjust the energizing timing of the reception point storage units 38.

First, measurement is started from a start signal at time t0 and the first ultrasonic vibrator 32 is driven through the transmission unit 34. An ultrasonic wave signal generated here propagates through the flow path and at time t1, an ultrasonic wave produced from the first ultrasonic vibrator 32 arrives at the second ultrasonic vibrator 33.

At time t2 before the time t1, energizing of the reception point storage units 38 is started using the power supply unit 43. t2 is set to a sufficiently shorter time than t1.

Thus, the control unit 42 has the power supply unit 43 for energizing the reception point storage units 38 for storing output of the reception point detection unit 37 for a long time only the first time, whereby it is made possible to reliably capture a reception wave by preparing for storing output of the reception wave detection unit before essential reception wave arrival at the first measurement time.

At the first time, the reception point is determined and the propagation time is found. In this case, it becomes easy to adjust the energizing time at the second time or later. For example, energizing of the reception point storage units 38 is started at t2 initially in FIG. 7, but actually an ultrasonic wave propagates and is received at t1.

Since the propagation time does not drastically change at the next measurement, it is made possible for the power supply unit 43 existing in the control unit 42 to wait for energizing until t2 near to t1, at which a reception signal does not yet arrive.

At the third time, the propagation time is predicted using the propagation time at the second time or the moving average of the propagation times at the first time and the second time and it is made possible to shorten the energizing time to the utmost.

Thus, the control unit 42 adjusts the timing of the power supply unit 43 so as to shorten energizing the reception point storage units 38 for storing output of the reception point detection unit 37 at the second time or later based on the previous value, whereby it is made possible to reliably capture a reception wave and perform power saving operation by preparing for storing output of the reception wave detection unit just before arrival of the reception wave.

In the description, only the energizing time of the reception point storage units 38 is adjusted; however, if the downstream operation from the reception unit 35 for amplifying a reception signal does not long continue in an unstable state at power-on, if energizing of all the system or the part particularly requiring power is adjusted in the power supply unit 43, further power saving is made possible.

Figure 8:
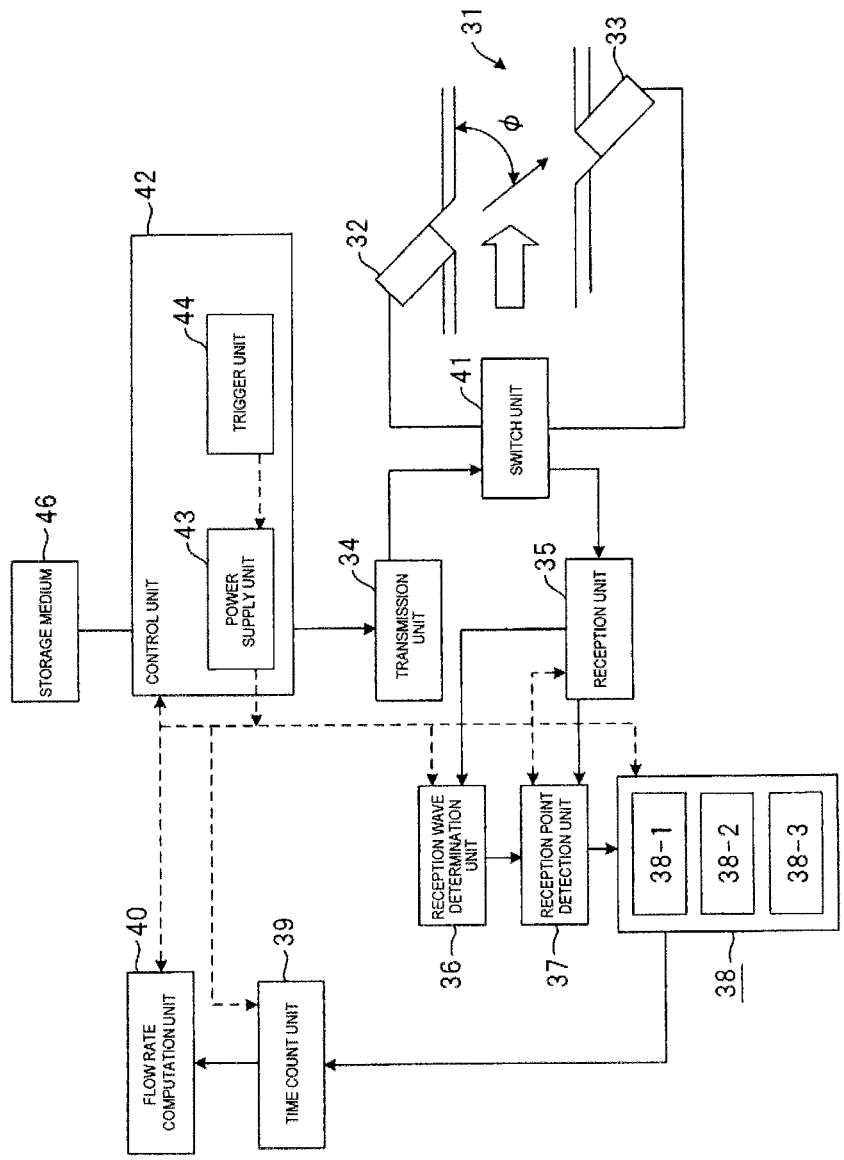
FIG. 8 is a general block diagram to show another operation configuration of the flow measurement device of the embodiment.

FIG. 8 shows the configuration for making possible such further power saving. Here, the state from zero crossing point a to d in FIG. 5 is equivalent to enlargement of the vicinity from t3 to t1 in FIG. 7.

In this case, the reception unit 35 operates before arrival of a reception signal and the reception point detection unit 37 also operates and sends a signal for each of a, b, c, and d.

In FIG. 8, the control unit 42 counts the number of output signals of the reception point detection unit 37 and when the predetermined number of times, for example, twice is reached, if the reception point arrives to the b point, a trigger unit 44 starts energizing the reception point storage units 38 through the power supply unit 43. The energizing time to tx where reception is determined can be more shortened.

Thus, the control unit 42 has the trigger unit 44 for outputting a signal when the reception point detection unit 37 outputs exceeding the predetermined number of times and the power supply unit 43 for controlling energization and the power supply unit 43 starts energizing the reception point storage units 38 for storing output of the reception point detection unit 37 according to output of the trigger unit, thereby storing as many zero crossing points as the number of zero crossing points to Vref or the number of reception point storage units 38 previously preparing.

The propagation time is found using two consecutive zero crossing point data pieces from among them. Thus, it is checked that reliably a reception wave arrives and then preparation for storing output of the reception point detection unit 37 is made, whereby reliability is improved and further it is made possible to perform power saving operation by performing the short time operation.

The zero crossing point in FIG. 5 occurs in an almost half period of a transmission frequency if noise is not superposed on a reception wave.

However, when actually a fluid flows into the flow path, something operates downstream by the fluid. A spike-like signal may be superposed on a reception wave because of the operation or any other external noise, etc.

In this case, if the zero crossing point of noise is adopted as a reception point, calculation of the propagation time largely differs.

Figure 9:
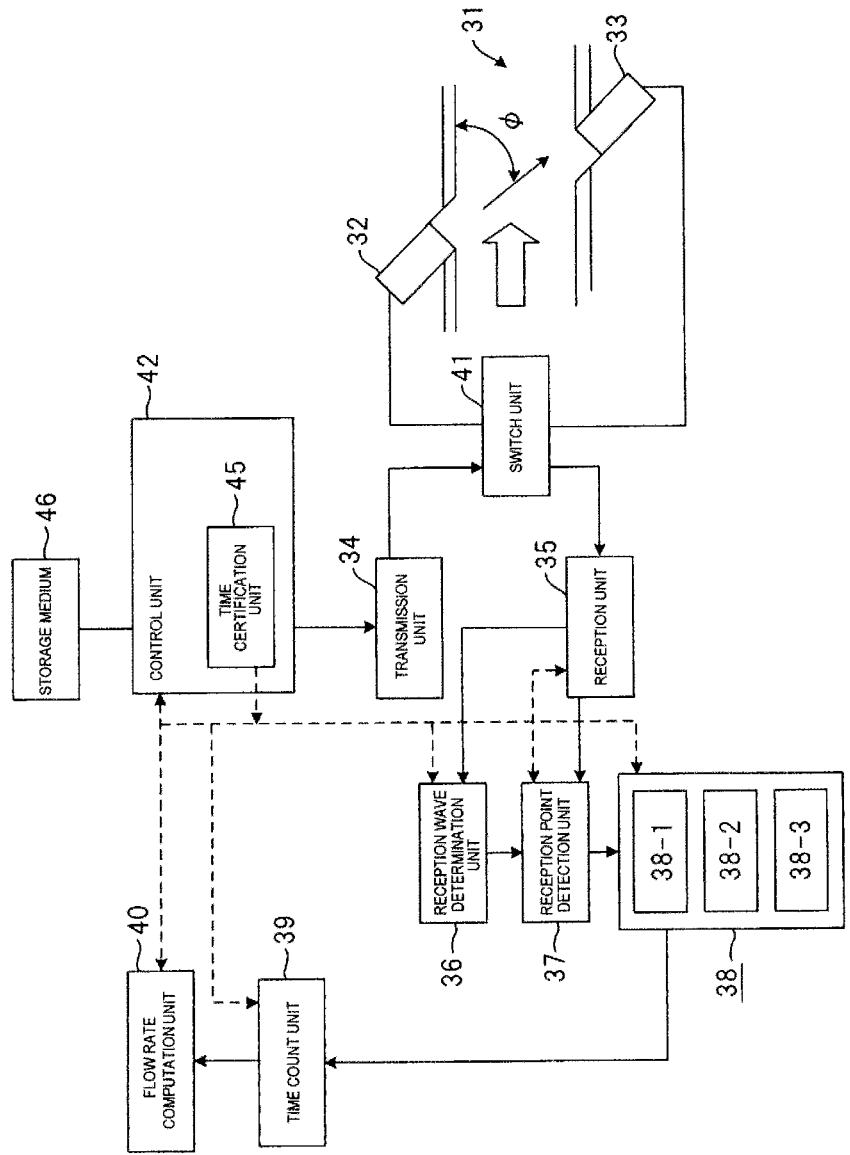
FIG. 9 is a general block diagram to show another operation configuration of the flow measurement device of the embodiment.

As a configuration for preventing this, the control unit 42 is provided with a time certification unit 45 as shown in FIG. 9. The operation will be discussed below:

First, when receiving a zero crossing point is started in a similar manner to that in FIG. 5, the reception point detection unit 37 outputs a signal and the reception point storage unit 38-1 stores this output signal. If the stored value is the elapsed time from the transmission time or the number of pulses, etc., having a specific constant duration capable of measuring the elapsed time, it becomes easy to perform the later computation.

Next, when the point becomes point b, likewise the reception point detection unit 37 outputs a signal and the reception point storage unit 38-2 stores the reception point data. This is repeated for points c and d and the point of tx is stored and then the reception signal exceeds Vref.

At this time, the reception wave determination unit 36 outputs a signal for the first time. When the reception wave determination unit 36 outputs a signal, the control unit 42 prevents the reception point detection unit 37 from outputting a signal at the later zero crossing point or prohibits write into the reception point storage units 38.

The time of the next zero crossing point ta is sent directly to the time certification unit 45 without the intervention of the control unit 42.

The time certification unit 45 finds the difference between the value of the reception point data stored in the reception point storage units 38 and the value of ta in order.

If the difference is within a predetermined range, it is determined that data of the a, b, c, tx point is not caused by noise and it is determined that the data can be adopted as flow rate computation. The two consecutive zero crossing points are used to compute the flow rate.

For example, assuming that the transmission frequency is 100 kHz, a half period becomes 5 µs. Then, if tx−ta is within predetermined 5 µs proximity, it is determined that tx is a valid reception point.

Likewise, if a−ta is within the proximity of an integral multiple of 5 µs, a is determined a valid reception point. For the b, c, and d points, a similar determination is also made.

Thus, the control unit 42 has the time certification unit 45 for computing the difference between the output of the reception point detection unit 37 after the output of the reception wave determination unit 36 and the value in the reception point storage units 38 and if the value of the time certification unit 45 is within a predetermined value, measurement is determined valid measurement, so that erroneous detection of a zero crossing point caused by noise, etc., can be prevented and a precise zero crossing point is selected, whereby it is made possible to improve reliability.

After the reception signal exceeds Vref ahead of the zero crossing point tx in FIG. 5, the circuitry following the reception unit 35 needs not be operated except the time count unit 39 or the flow rate computation unit 40.

Therefore, if the reception wave determination unit 36 detects the reception wave exceeding Vref, the control unit 42 can stop energizing the reception point storage units 38 to perform power saving operation and can also stop the energizing operation of an unnecessary reception circuit.

The stopping point in time may be just after Vref is exceeded or since noise occurs by a signal at the energization stopping time and the operation of the time count unit 39, etc., may be adversely affected, energizing may be stopped after the next zero crossing point ta is detected.

Thus, the control unit 42 stops power supply to the reception point storage units 38 through the power supply unit 43 after the expiration of a predetermined time after output of the reception point detection unit 37 after output of the reception wave determination unit 36, whereby the operation of measuring and storing an extra zero crossing point can be stopped and it is made possible to realize the power saving operation.

In FIG. 4, the reception arrival point is described as the average value Ta' of the two points of tx and ta can be determined, but it may seem to be different from the conventional arrival point Ta and thus a description is given below:

The essential reception arrival point becomes the a point in FIG. 3. It is very difficult to detect only the point as described above.

Then, the time Ta to ta is found and a predetermined constant is deducted, thereby finding the time to the a point.

Therefore, when tx and ta are used, if the predetermined constant is adjusted by the value of a quarter period of the reception wave (ta−tx)/2, the time to the reception arrival point a can be computed. Since Ta' involves a smaller error than Ta, the time to a can be found stably.

(Embodiment 2)

A flow measurement device of embodiment 2 will be discussed. The flow measurement device differs from the flow measurement device of embodiment 1 in that it uses a storage medium 46 having a program for causing a computer to function to ensure the operation of control unit 42 for controlling at least one of vibrators 32 and 33, a transmission unit 34, a reception unit 35, a reception wave determination unit 36 for outputting a signal when a signal of the reception unit 35 becomes a predetermined value, a reception point detection unit 37 for outputting a signal when a signal of the reception unit 35 becomes a predetermined range, reception point storage units 38 for storing output of the reception point detection unit 37, a time count unit 39 for counting the propagation time of an ultrasonic wave signal propagating between the vibrators using each signal of the reception point storage units 38, a flow rate computation unit 40 for calculating the flow rate based on the time count difference of the time count unit 39, and a switch unit 41 for switching transmission and reception.

To perform the operation of the control unit 42 shown in embodiment 1 in FIG. 1, the operation and an energizing method of the reception point storage units for finding tx are previously found by experiment, etc., correlation of the operation timings, etc., concerning secular change, temperature change, and system stability is found, and software is stored on the storage medium 46 as a program.

Usually, if it can be electrically written into memory of a microcomputer, flash memory, etc., it is made convenient to use.

The number of condition settings, etc., increases because the transmission and reception directions change as the switch unit 41 operates; if it is adjusted by the operation of a computer, it can be easily realized.

Thus, when it is made possible to perform the operation of the control unit 42 as programmed, it becomes easy to set and change conditions of correction coefficients of flow rate computation, adjust measurement intervals, etc., and secular change, etc., can also be flexibly dealt with, so that the accuracy of flow velocity or flow rate measurement can be improved more flexibly.

(Embodiment 3)

Figure 10:
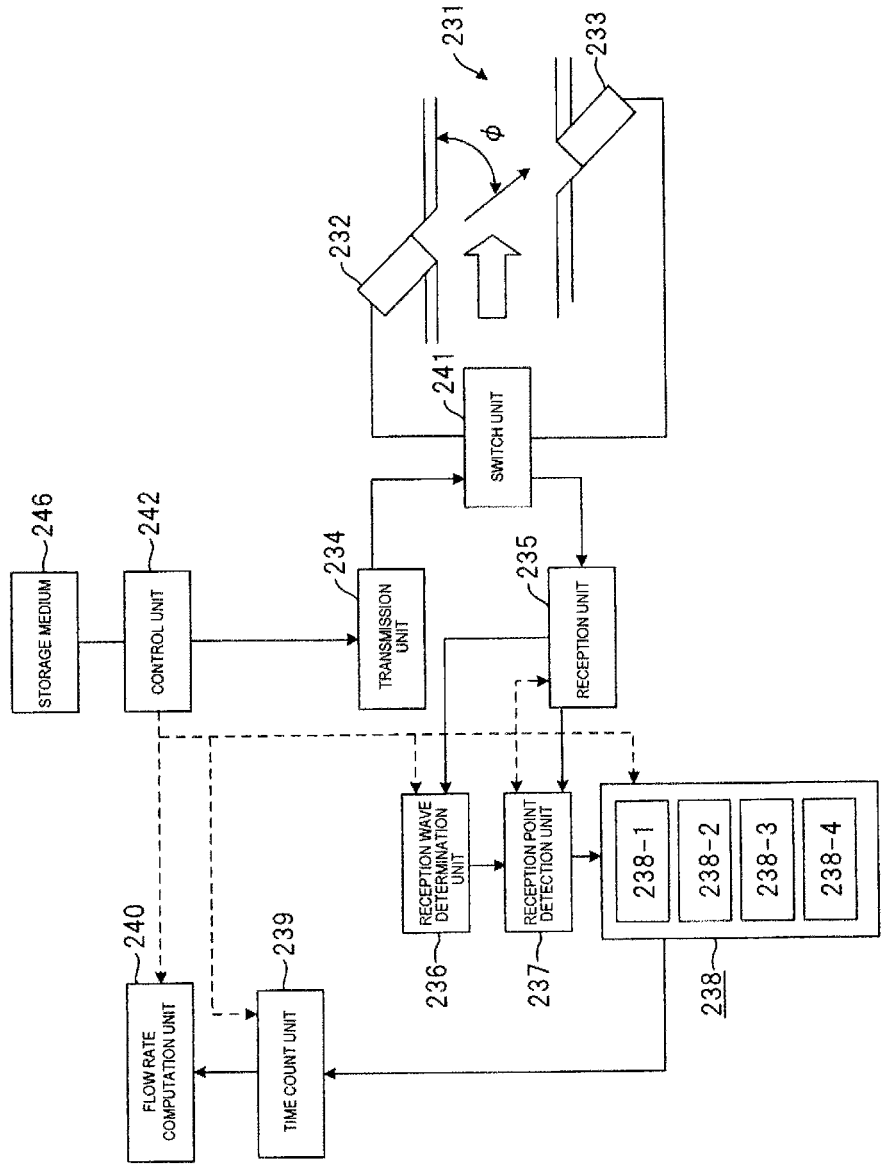
FIG. 10 is a general block diagram of a flow measurement device according to embodiment 3 of the invention.

In FIG. 10, an ultrasonic flowmeter of the embodiment forming a flow measurement device has a flow path 231 where a measured fluid flows and a first vibrator 232 and a second vibrator 233 placed in the flow path 231 for transmitting and receiving an ultrasonic wave. It also has a transmission unit 234 for driving the first vibrator 232 and the second vibrator 233, a reception unit 235 for receiving reception signals of the first vibrator 232 and the second vibrator 233 and amplifying the signals, a reception wave determination unit 236 for outputting a signal when the signal of the reception unit 235 becomes a predetermined value, and a reception point detection unit 237 for outputting a signal when the signal of the reception unit 235 becomes a predetermined range. It also has two reception point storage units 238 for storing output of the reception point detection unit 237, a time count unit 239 for counting the propagation time of an ultrasonic wave signal propagating between the vibrators using each signal of the reception point storage units 238, and a flow rate computation unit 240 for calculating the flow rate based on the time count difference of the time count unit 239.

Further, a switch unit 241 is provided between the transmission unit 234 and the first vibrator 232 and between the second vibrator 233 and the reception unit 235 so that the first vibrator 232 and the second vibrator 233 switch between transmission and reception of an ultrasonic wave for operation. The reception point storage units 238 have at least two or more storage sections and after storage starts, data is overwritten for update until an output signal of the reception wave determination unit 236 comes.

A control unit 242 controls at least one of the transmission unit 234, the reception unit 235, and the reception wave determination unit 236, the reception point detection unit 237, the reception point storage units 238, and the time count unit 239, the flow rate computation unit 240, and the switch unit 241.

For the operation of usual flow velocity or flow rate measurement, the flow velocity and the flow rate can be found according to (expression 1) to (expression 4) as described in embodiment 1, and the operation will not be discussed again.

Figure 11:
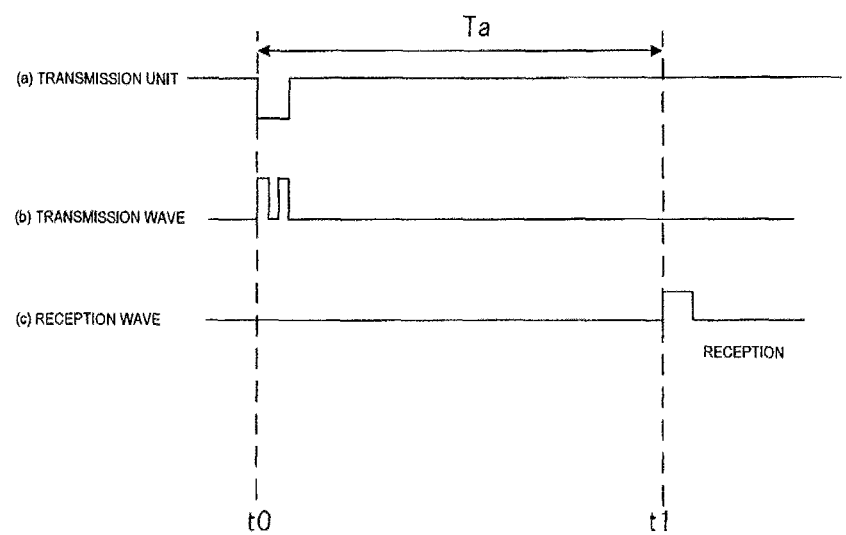
FIG. 11 (a) is a timing chart to show the operation of measurement control unit in the measurement device; (b) is a timing chart to show the operation of a transmission wave in the measurement device; and (c) is a timing chart to show the operation of a reception wave and a reflected wave in the measurement device.

The operation will be discussed with a timing chart of FIG. 11 and reception waveforms in FIGS. 12 and 13. Measurement is started from a start signal at time t0 by the control unit 242 and the first ultrasonic vibrator 232 is driven through the transmission unit 234.

An ultrasonic wave signal generated here propagates through the flow path and at time t1, an ultrasonic wave produced from the first ultrasonic vibrator 232 arrives at the second ultrasonic vibrator 233.

The reception signal is amplified by the reception unit 235 and when the signal level becomes a predetermined value (Vref), the reception wave determination unit 236 determines that the reception wave arrives, and outputs a signal. The reception point detection unit 237 starts to operate based on the signal and outputs a signal by assuming that the first zero crossing point after Vref is a reception point and the time to the point is found by the time count unit 239. Transmission and reception are switched by the switch unit 241 and similar operation is performed and the flow rate computation unit 240 calculates the flow rate based on the difference between the time found by the time count unit 239 and the time found a little while ago.

Figure 12:
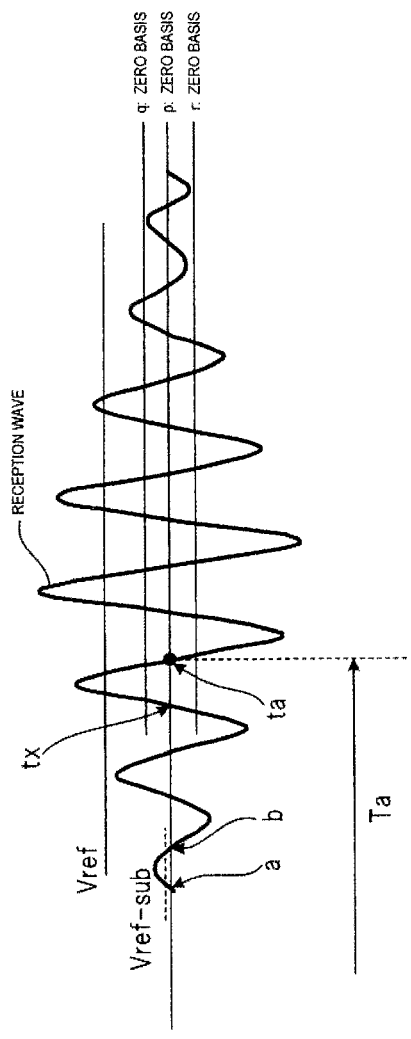
FIG. 12 is a timing chart to show a reception wave in the measurement device.

Here, ta point in FIG. 12 is placed after Vref, because the value of Vref is used as reception wave determination and the zero crossing point ta after Vref is adopted as the reception point.

For example, assuming that a signal wave is 100 kHz and that the propagation time is the neighborhood of 100 μs, a zero crossing point like ta occurs every 5 μs.

The reception wave also arrives before Vref as seen in FIG. 12. As a signal before Vref can be more used, it becomes harder for an uncertain time to be contained in the ultrasonic wave arrival time. Further, if a signal 5 μs before can be used, to measure 100-μs propagation time, it is made possible to shorten the measurement time as much as 5% and a reduction in the current consumption can be realized. The zero basis used as the basis of the zero crossing point is p.

If an offset occurs on the plus side, the zero basis becomes as q and the zero crossing point arrives earlier than the essential point. In contrast, if an offset occurs on the minus side, the zero basis becomes as r and the zero crossing point occurs later than the essential point.

Likewise, if noise occurs and the reception waveform shifts to the plus side, the zero crossing point arrives later than the essential ta point; in contrast, if the reception waveform shifts to the minus side because of noise, etc., the zero crossing point arrives earlier than the essential ta point.

Thus, it is considered that if reception point determination of only one point is made, the accuracy of the reception time worsens because of disturbance of an offset, noise, etc.

Then, a method of detecting a zero crossing point before Vref and finding a reception point with good accuracy even if disturbance of an offset, etc., occurs will be discussed. Here, a method of starting to detect the zero crossing point before Vref will be discussed.

It is good that simply the reception wave arrival point, for example, a point in FIG. 12 can be found for the zero crossing point, in which case Vref cannot be set.

If the next b point near to the a point is adopted as the reception wave arrival point, Vref must be set to dashed line Vref-sub. In this case, since it is close to a zero signal, reaction occurs due to change in the waveform, small noise, etc., when the flow rate flows, and there is a possibility of erroneous detection.

To circumvent such a phenomenon and determine the reception wave arrival point with better accuracy than usual ta, if an even number of two or more zero crossing points are found consecutively and an average value thereof is used, offset shift can be canceled.

Figure 13:
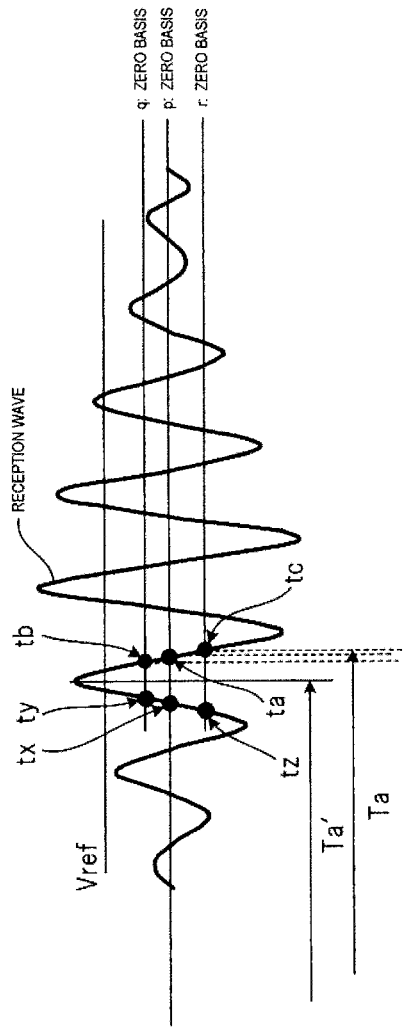
FIG. 13 is a timing chart to show measurement of a reception wave in the measurement device.

For example, the conventional zero crossing point may shift from ta point to tb, tc point because an offset occurs as shown in FIG. 13.

In this case, Ta time becomes very unstable as the reception wave arrival point. If two zero crossing points are used and an average thereof is found, tx is adopted relative to ta, ty is adopted relative to tb, and tz is adopted relative to tc and their average Ta' becomes a constant value and becomes stable. Although tb after Vref is used here, the operation provides a similar effect if the reception wave before Vref is used and two zero crossing points are used.

If an even number of zero crossing points are used, it is made possible to more narrow down by average operation than the case of two reception point variations caused by zero basis shift.

That is, to prevent erroneous detection caused by waveform change, noise, etc., and determine the reception wave arrival point in a shorter time than usual ta, an even number of at least two or more zero crossing points before Vref may be detected and an average value thereof may be found.

To realize this operation, measurement is started from a start signal at time t0 by the control unit 242 and the first ultrasonic vibrator 232 is driven through the transmission unit 234.

An ultrasonic wave signal generated here propagates through the flow path and at time t1, an ultrasonic wave produced from the first ultrasonic vibrator 232 arrives at the second ultrasonic vibrator 233. The reception signal is amplified by the reception unit 235 and when the signal level becomes a predetermined value (Vref), the reception wave determination unit 236 determines that the reception wave arrives, and outputs a signal.

Thus, the reception point detection unit 237 for outputting a signal when a predetermined range as the zero crossing point, for example, the range of plus 1 mV to minus 1 mV is entered starts to operate.

Figure 14:
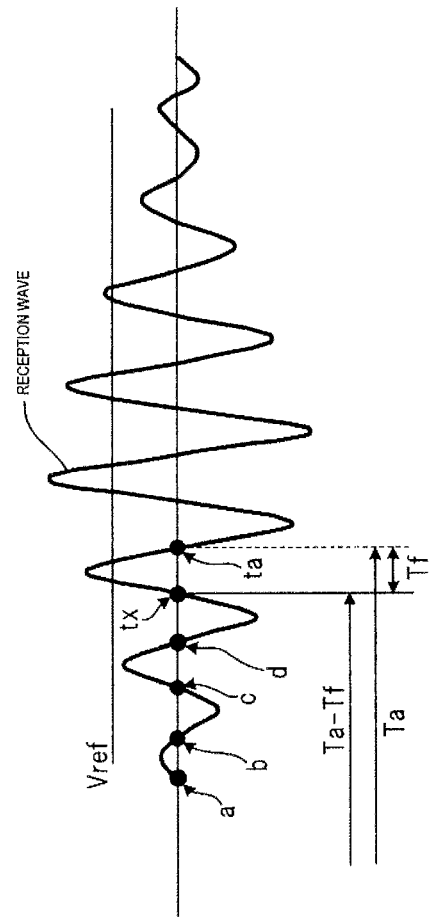
FIG. 14 is a timing chart to show a reception wave in the measurement device.

When the point becomes point a in FIG. 14, the reception point detection unit 237 outputs a signal and the reception point storage unit 238-1 stores this output signal. If the stored value is the elapsed time from the transmission time or the number of pulses, etc., having a specific constant duration capable of measuring the elapsed time, it becomes easy to perform the later computation.

Next, when the point becomes point b in FIG. 14, likewise the reception point detection unit 237 outputs a signal and the data is stored in the reception point storage unit 238-2. Likewise, the reception point data at the next point c is stored in the reception point storage unit 238-3 in order.

In this case, if the number of reception point data pieces is larger than the number of storage units 238, the control unit 242 may control the write order so that the data is overwritten in order starting at the oldest reception point.

Figure 15:
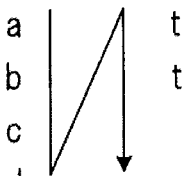
FIG. 15 is a timing chart to show the operation of reception point storage units in the measurement device.

For example, when data is stored in up to the reception point storage unit 238-4, then the data in the reception point storage unit 238-1 is overwritten as in FIG. 15.

The reception wave determination unit 236 does not output a signal until the reception signal exceeds Vref. When the reception wave determination unit 236 outputs a signal, the control unit 242 prevents the reception point detection unit 237 from outputting a signal at the later zero crossing point or prohibits write into the reception point storage units 238.

Since at least one or more zero crossing points to tx are stored by performing the operation, an even number of two or more points are used from among them and an average value thereof is used to find the propagation time in the time count unit 239.

According to the configuration, the propagation time of the ultrasonic wave propagating between the upstream ultrasonic vibrator and the downstream ultrasonic vibrator, namely, the arrival time of the ultrasonic wave can be measured by using consecutively at least two or more zero crossing point arrival times of the ultrasonic wave received before the trigger level and finding an average value thereof.

Thus, if an offset, etc., is superposed, it can be canceled at the rising zero point and the falling zero point. Transmission and reception are switched by the switch unit 241 and similar operation is performed and the flow rate computation unit 240 calculates the flow rate based on the difference between the time found by the time count unit 239 and the time found a little while ago. Consequently, the propagation time hitherto taken up to ta in FIG. 14 can be determined up to tx or the zero crossing point before tx.

Specifically, for the time of Ta–Tf, the measurement operation time of the propagation time can be shortened as much as the integer portion of half period Tf of transmission frequency.

Hitherto, the propagation time has been determined at ta in FIG. 14, but the effect of an offset cannot be circumvented. In the method of the embodiment, an average value of zero crossing points is used, whereby an error contained in the propagation time or the arrival time of the measured ultrasonic wave can be lessened and highly accurate flow measurement can be realized.

Even in a state in which the number of zero crossing points increases, a plurality of zero crossing points in the proximity of the reception wave determination unit can be captured reliably and the number of reception point storage units is lessened properly and data is overwritten in order, whereby power saving operation is made possible.

Although the reception point storage units 238 for storing output of the reception point detection unit 237 consumes power to perform the storage operation, often what point in time the storage unit may be energized from is previously unknown.

If power is turned on too early, it is wasted; if the storage unit is energized after passage of a reception point, the operation is meaningless.

Figure 16:
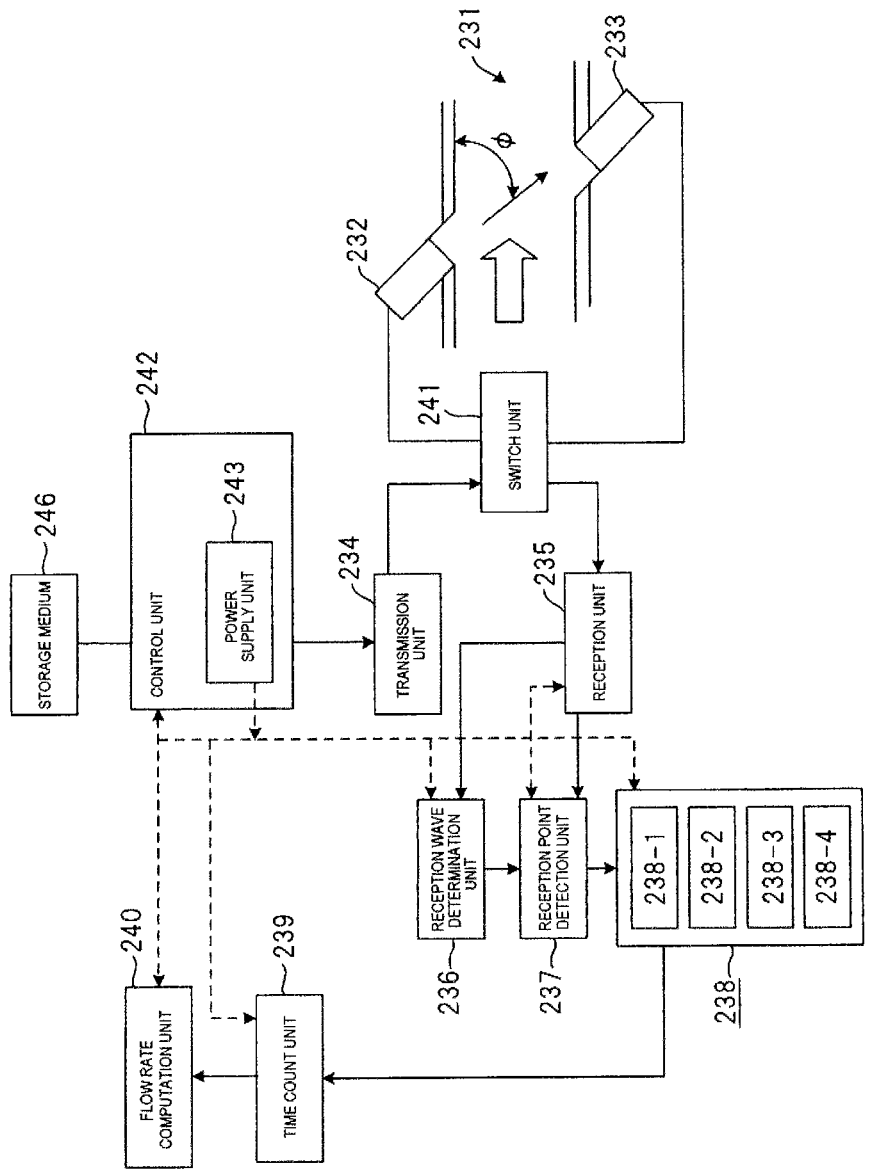
FIG. 16 is a general block diagram to show another operation configuration of the flow measurement device of the embodiment.

Then, a power supply unit 243 is provided in the control unit 242 for performing power control as in the configuration shown in FIG. 16. The timing will be discussed with FIG. 17.

To start measurement initially, Ta is unknown. Although an approximate time can be estimated from the physical distance between the ultrasonic vibrators 232 and 233, the time is not certain.

Then, the control unit 242 uses the power supply unit 243 to adjust the energizing timing of the reception point storage units 238.

First, measurement is started from a start signal at time t0 and the first ultrasonic vibrator 232 is driven through the transmission unit 234.

An ultrasonic wave signal generated here propagates through the flow path and at time t1, an ultrasonic wave produced from the first ultrasonic vibrator 232 arrives at the second ultrasonic vibrator 233. At time t2 before the time t1, energizing of the reception point storage units 238 is started using the power supply unit 243. t2 is set to a sufficiently shorter time than t1.

Thus, the control unit 242 has the power supply unit 243 for energizing the reception point storage units 238 for storing output of the reception point detection unit 237 for a long time only the first time, whereby it is made possible to reliably capture a reception wave by preparing for storing output of the reception wave detection unit before essential reception wave arrival at the first measurement time.

At the first time, the reception point is determined and the propagation time is found. In this case, it becomes easy to adjust the energizing time at the second time or later.

Figure 17:
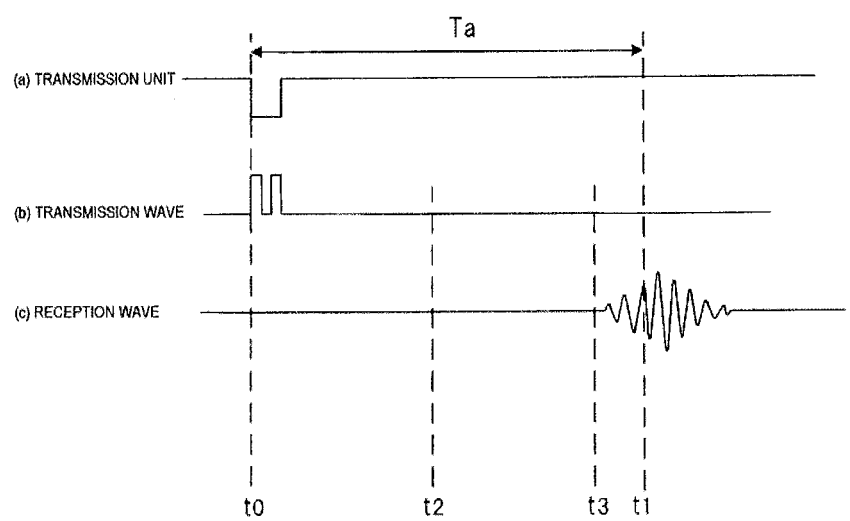
FIG. 17 (a) is a timing chart to show the operation of measurement control unit in the measurement device; (b) is a timing chart to show the operation of a transmission wave in the measurement device; and (c) is a timing chart to show the operation of a reception wave and a reflected wave in the measurement device.

For example, energizing of the reception point storage units 238 is started at t2 initially in FIG. 17, but actually an ultrasonic wave propagates and is received at t1.

Since the propagation time does not drastically change at the next measurement, it is made possible for the power supply unit 243 existing in the control unit 242 to wait for energizing until t2 near to t1, at which a reception signal does not yet arrive.

At the third time, the propagation time is predicted using the propagation time at the second time or the moving average of the propagation times at the first time and the second time and it is made possible to shorten the energizing time to the utmost.

Thus, the control unit 242 adjusts the timing of the power supply unit 243 so as to shorten energizing the reception point storage units 238 for storing output of the reception point detection unit 237 at the second time or later based on the previous value, whereby it is made possible to reliably capture a reception wave and perform power saving operation by preparing for storing output of the reception wave detection unit just before arrival of the reception wave.

In the description, only the energizing time of the reception point storage units 238 is adjusted; however, if the downstream operation from the reception unit 235 for amplifying a reception signal does not long continue in an unstable state at power-on, if energizing of all the system or the part particularly requiring power is adjusted in the power supply unit 243, further power saving is made possible.

Figure 18:
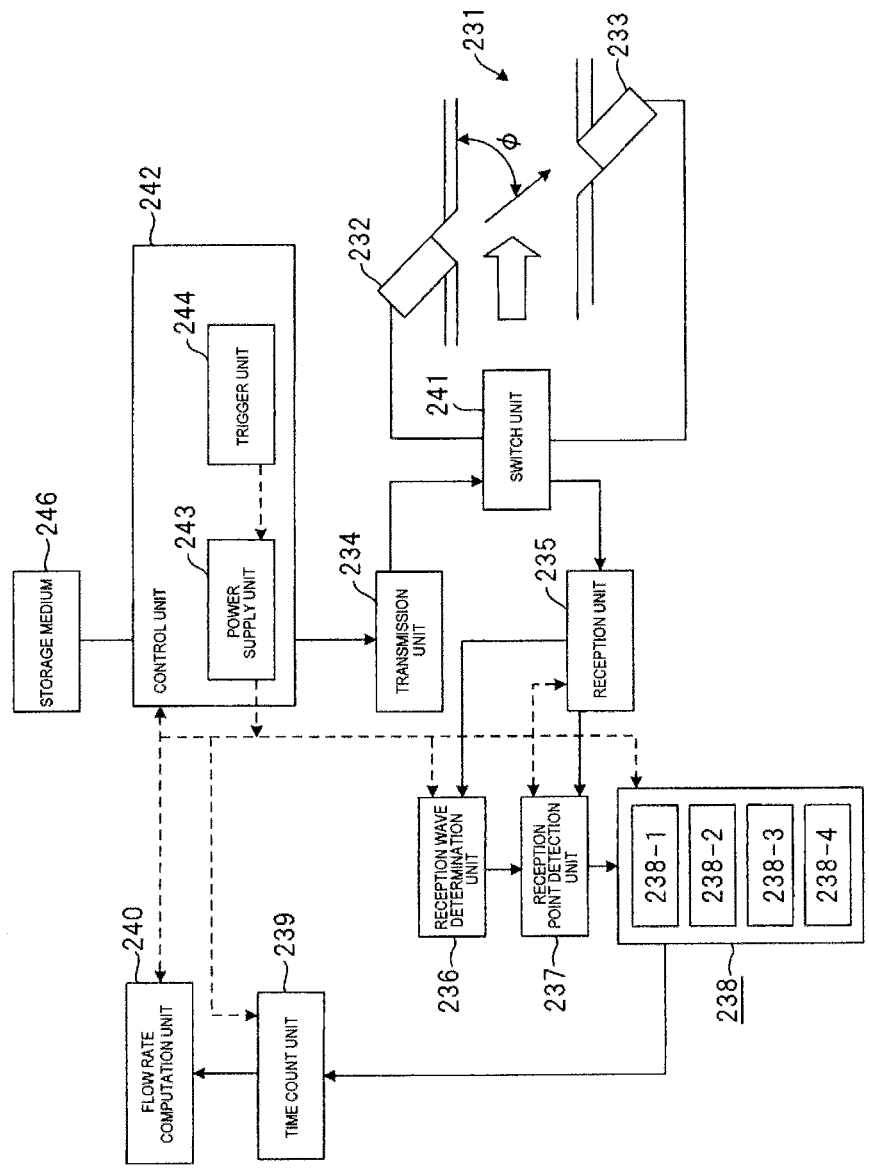
FIG. 18 is a general block diagram to show another operation configuration of the flow measurement device of the embodiment.

FIG. 18 shows the configuration for making possible such further power saving. Here, the state from zero crossing point a to d in FIG. 14 is equivalent to enlargement of the vicinity from t3 to t1 in FIG. 17. In this case, the reception unit 235 operates before arrival of a reception signal and the reception point detection unit 237 also operates and sends a signal for each of a, b, c, and d.

In FIG. 18, the control unit 242 counts the number of output signals of the reception point detection unit 237 and when the predetermined number of times, for example, twice is reached, if the reception point arrives to the b point, a trigger unit 244 starts energizing the reception point storage units 238 through the power supply unit 243. The energizing time to tx where reception is determined can be more shortened.

Thus, the control unit 242 has the trigger unit 244 for outputting a signal when the reception point detection unit 237 outputs exceeding the predetermined number of times and the power supply unit 243 for controlling energization and the power supply unit 243 starts energizing the reception point storage units 238 for storing output of the reception point detection unit 237 according to output of the trigger unit, thereby storing as many zero crossing points as the number of zero crossing points to Vref or the number of reception point storage units 238 previously preparing. The propagation time is found using two consecutive zero crossing point data pieces from among them.

Thus, it is checked that reliably a reception wave arrives and then preparation for storing output of the reception point detection unit 237 is made, whereby reliability is improved and further it is made possible to perform power saving operation by performing the short time operation.

The zero crossing point in FIG. 14 occurs in an almost half period of a transmission frequency if noise is not superposed on a reception wave.

However, when actually a fluid flows into the flow path, something operates downstream by the fluid. A spike-like signal may be superposed on a reception wave because of the operation or any other external noise, etc. In this case, if the zero crossing point of noise is adopted as a reception point, calculation of the propagation time largely differs.

Figure 19:
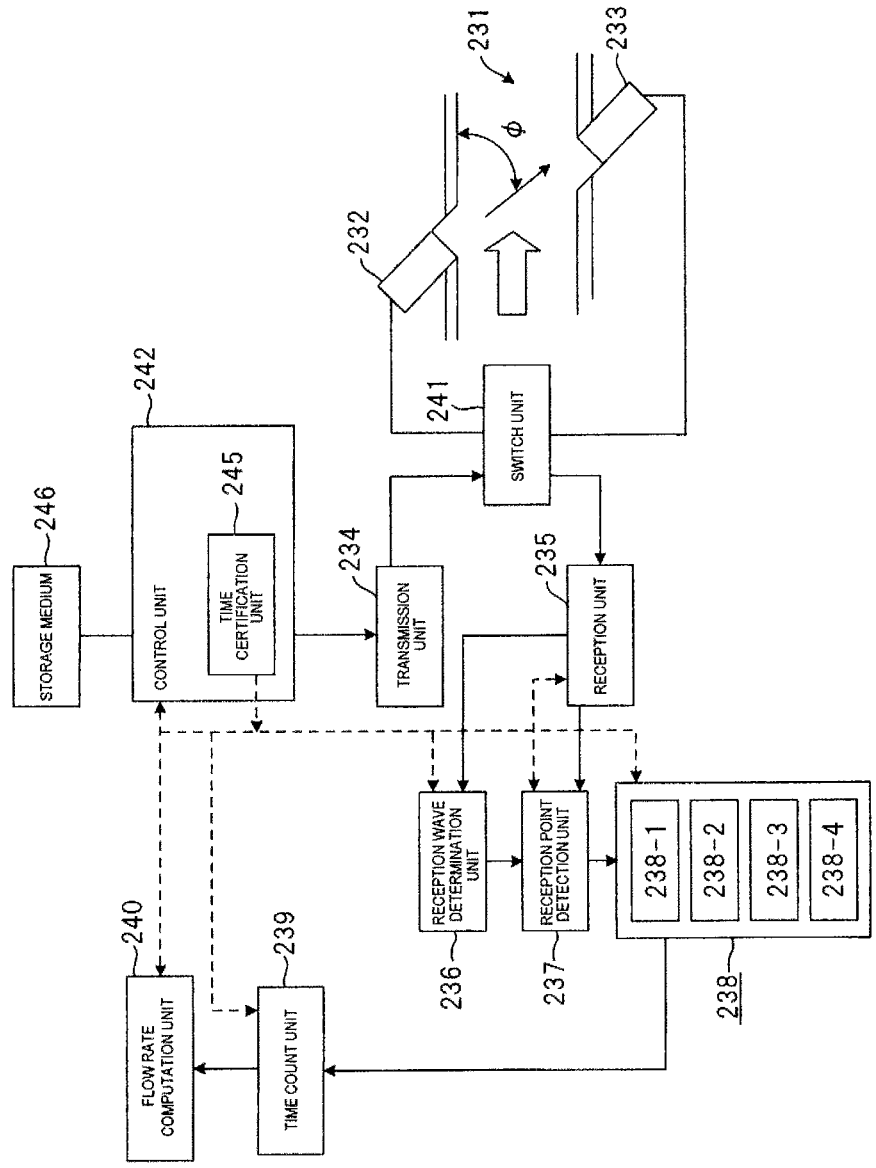
FIG. 19 is a general block diagram to show another operation configuration of the flow measurement device of the embodiment.
Figure 20:
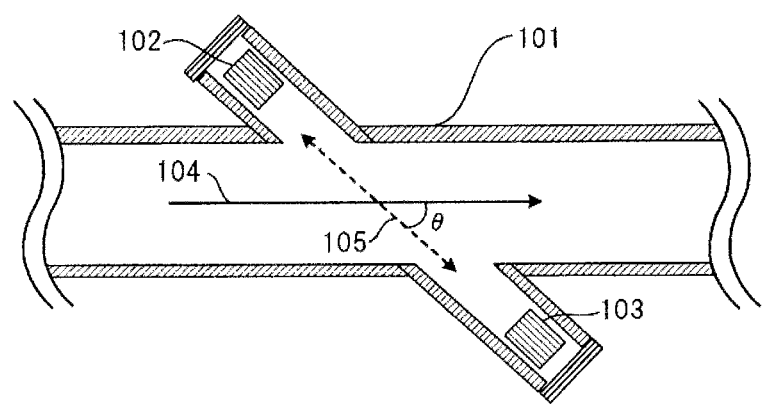
FIG. 20 is a sectional view of a conventional flow measurement device.

As a configuration for preventing this, the control unit 242 is provided with time certification unit 245 as shown in FIG. 19. The operation will be discussed below:

First, when receiving a zero crossing point is started in a similar manner to that in FIG. 14, the reception point detection unit 237 outputs a signal and the reception point storage unit 238-1 stores this output signal.

If the stored value is the elapsed time from the transmission time or the number of pulses, etc., having a specific constant duration capable of measuring the elapsed time, it becomes easy to perform the later computation.

Next, when the point becomes point b, likewise the reception point detection unit 237 outputs a signal and the reception point storage unit 238-2 stores the reception point data.

This is repeated for points c and d and the point of tx is stored and then the reception signal exceeds Vref.

At this time, the reception wave determination unit 236 outputs a signal for the first time. When the reception wave determination unit 236 outputs a signal, the control unit 242 prevents the reception point detection unit 237 from outputting a signal at the later zero crossing point or prohibits write into the reception point storage units 238.

The time of the next zero crossing point ta is sent directly to the time certification unit 245 without the intervention of the control unit 242.

The time certification unit 245 finds the difference between the value of the reception point data stored in the reception point storage units 238 and the value of ta in order.

If the difference is within a predetermined range, it is determined that data of the a, b, c, tx point is not caused by noise and it is determined that the data can be adopted as flow rate computation. An even number of two or more consecutive zero crossing points are used to compute the flow rate.

For example, assuming that the transmission frequency is 100 kHz, a half period becomes 5 μs. Then, if tx−ta is within predetermined 5 μs proximity, it is determined that tx is a valid reception point.

Likewise, if a-ta is within the proximity of an integral multiple of 5 μs, a is determined a valid reception point. For the b, c, and d points, a similar determination is also made.

Thus, the control unit 242 has the time certification unit 245 for computing the difference between the output of the reception point detection unit 237 after the output of the reception wave determination unit 236 and the value in the reception point storage units 238 and if the value of the time certification unit 245 is within a predetermined value, measurement is determined valid measurement, so that erroneous detection of a zero crossing point caused by noise, etc., can be prevented and a precise zero crossing point is selected, whereby it is made possible to improve reliability.

After the reception signal exceeds Vref ahead of the zero crossing point tx in FIG. 14, the circuitry following the reception unit 235 needs not be operated except the time count unit 239 or the flow rate computation unit 240.

Therefore, if the reception wave determination unit 236 detects the reception wave exceeding Vref, the control unit 242 can stop energizing the reception point storage units 238 to perform power saving operation and can also stop the energizing operation of an unnecessary reception circuit.

The stopping point in time may be just after Vref is exceeded or since noise occurs by a signal at the energization stopping time and the operation of the time count unit 239, etc., may be adversely affected, energizing may be stopped after the next zero crossing point to is detected.

Thus, the control unit 242 stops power supply to the reception point storage units 238 through the power supply unit 243 after the expiration of a predetermined time after output of the reception point detection unit 237 after output of the reception wave determination unit 236, whereby the operation of measuring and storing an extra zero crossing point can be stopped and it is made possible to realize the power saving operation.

In FIG. 13, the reception arrival point is described as the average value Ta' of the two points of tx and ta can be determined, but it may seem to be different from the conventional arrival point Ta and thus a description is given below:

The essential reception arrival point becomes the a point in FIG. 12. It is very difficult to detect only the point as described above.

Then, the time Ta to ta is found and a predetermined constant is deducted, thereby finding the time to the a point.

Therefore, when tx and ta are used, if the predetermined constant is adjusted by the value of a quarter period of the reception wave (ta-tx)/2, the time to the reception arrival point a can be computed. Since Ta' involves a smaller error than Ta, the time to a can be found stably. In this description, two zero crossing points are used, but the time can also be found stably if an even number of zero crossing points are used.

(Embodiment 4)

A flow measurement device of embodiment 4 will be discussed. The flow measurement device differs from the flow measurement device of embodiment 3 in that it uses a storage medium 246 having a program for causing a computer to function to ensure the operation of a control unit 242 for controlling at least one of vibrators 232 and 233, a transmission unit 234, a reception unit 235, a reception wave determination unit 236 for outputting a signal when a signal of the reception unit 235 becomes a predetermined value, a reception point detection unit 237 for outputting a signal when a signal of the reception unit 235 becomes a predetermined range, reception point storage units 238 for storing output of the reception point detection unit 237, a time count unit 239 for counting the propagation time of an ultrasonic wave signal propagating between the vibrators using each signal of the reception point storage unit 238, a flow rate computation unit 240 for calculating the flow rate based on the time count difference of the time count unit 239, and a switch unit 241 for switching transmission and reception.

To perform the operation of the control unit 242 shown in embodiment 3 in FIG. 10, the operation and an energizing method of the reception point storage units for finding tx are previously found by experiment, etc., correlation of the operation timings, etc., concerning secular change, temperature change, and system stability is found, and software is stored on the storage medium 246 as a program. Usually, if it can be electrically written into memory of a microcomputer, flash memory, etc., it is made convenient to use.

The number of condition settings, etc., increases because the transmission and reception directions change as the switch unit 241 operates; if it is adjusted by the operation of a computer, it can be easily realized.

Thus, when it is made possible to perform the operation of the control unit 242 as programmed, it becomes easy to set and change conditions of correction coefficients of flow rate computation, adjust measurement intervals, etc., and secular change, etc., can also be flexibly dealt with, so that the accuracy of flow velocity or flow rate measurement can be improved more flexibly.

In the embodiment, the operation of other components than the control unit 42, 242 may be performed as programmed by a microcomputer, etc.

Accordingly, the device has the program for causing a computer to function as control unit; operation setting and change of the measurement method can be easily made and secular change, etc., can also be flexibly dealt with, so that the accuracy of measurement can be improved more flexibly.

It is to be understood that the invention is not limited to the description disclosed in the embodiments and the invention also intends that those skilled in the art make changes, modifications, and application based on the Description and widely known arts, and the changes, the modifications, and the application are also contained in the scope to be protected.

This application is based on Japanese Patent Application (No. 2007-326890) filed on Dec. 19, 2007 and Japanese Patent Application (No. 2007-326891) filed on Dec. 19, 2007, which are incorporated herein by reference.

INDUSTRIAL APPLICABILITY

The flow measurement device of the invention overwrites and continues to store two zero crossing points and stops the operation when the reception wave determination unit outputs a signal indicating that the reception wave reliably arrives. Accordingly, a trigger point by the reception wave determination unit is set in a portion where the amplitude of a reception waveform is comparatively large, a trigger is operated stably, and an average value of optimum two zero crossing points or an even number of optimum two or more zero crossing points before the trigger can be used for propagation time measurement, so that the propagation time with a small error can be measured and the measurement time can be shortened and thus it is made possible to realize power saving operation.

The invention claimed is:
1. A flow measurement device comprising:
a pair of vibrators being placed across a flow path for transmitting and receiving an ultrasonic wave between them to measure a flow rate of fluid flowing through the flow path;

a transmission device that drives one of the vibrators to transmit an ultrasonic wave;

a reception unit responsive to an output signal from the other of the vibrators to convert the output signal into an electric signal representing cycles of the ultrasonic wave propagated from the one of the vibrators;

a reception wave determination unit that monitors the electric signal from the reception unit and outputs a detection signal when the wave in the cycles first becomes a predetermined value;

a reception point detection unit that detects zero-crossing points of the cycles from the electric signal;

a reception point storage that stores arrival times of at least two zero-crossing points detected by the reception point detection unit, wherein the stored arrival times comprise arrival times of adjacent zero-crossing points among a series of detected zero-crossing points starting from an earliest detected zero-crossing point through a last zero-crossing point detected immediately before the reception wave determination unit outputs the detection signal; and a flow rate computation unit that calculates the flow rate based on an average of the arrival times of adjacent zero-crossing points stored in the reception point storage.

2. The flow measurement device as claimed in claim 1, wherein the reception point storage writes an arrival time of newly detected zero-crossing point over an arrival time of an oldest detected zero-crossing point among stored arrival times.

3. The flow measurement device as claimed in claim 1, further comprising a power supply unit that turns on and off the reception point storage to adjust a duration of time during which the reception point storage is operable to store detected zero-crossing points.

4. The flow measurement device as claimed in claim 3, wherein the power supply unit turns on the reception point storage at a sufficient time before the ultrasonic wave is expected to arrive at the other of the vibrators in a first round of detecting the flow rate and turns on the reception point storage right before the ultrasonic wave is expected to arrive at the other of the vibrators in a subsequent round of detecting the flow rate.

5. The flow measurement device as claimed in claim 3, further comprising a trigger unit that triggers the power supply unit to turn on the reception point storage when a number of zero-crossing points detected by the reception point detection unit exceeds a predetermined number.

6. The flow measurement device as claimed in claim 3, wherein the power supply unit turns off the reception point storage the reception point detection unit detects the last zero-crossing point.

7. The flow measurement device as claimed in claim 1, wherein the flow rate computation unit calculates the flow rate from arrival times of adjacent two zero-crossing points which precede the last zero-crossing point by a predetermined number of zero-crossing points.

8. The flow measurement device as claimed in claim 1, further comprising a time certification unit that certifies that a stored arrival time of a particular zero-crossing point is valid when a time difference is close to an expected value between the stored arrival time and a point of time when the reception wave determination unit outputs the detection signal.

9. The flow measurement device as claimed in claim 1, further comprising a time certification unit that certifies that a stored arrival time of a particular zero-crossing point is valid when a time difference is close to an expected value between the stored arrival time and the arrival time of the last zero-crossing point.

10. The flow measurement device as claimed in claim 1, wherein the flow rate computation unit calculates the flow rate based on an average of the arrival time of the last zero-crossing point and an arrival time of a zero-crossing point immediately preceding the last zero-crossing point.

11. The flow measurement device as claimed in claim 1, wherein the arrival time stored in the reception point storage is represented by a number of pulses indicative of a propagation time of the ultrasonic wave between the vibrators.

12. The flow measurement device as claimed in claim 1, wherein the arrival time is measured from a time point when the one of the vibrators transmits the ultrasonic wave.

* * * * *